United States Patent
Anima et al.

(10) Patent No.: US 11,307,908 B2
(45) Date of Patent: *Apr. 19, 2022

(54) FORMAT-SPECIFIC DATA OBJECT PASSING BETWEEN APPLICATIONS

(71) Applicant: Google LLC, Mountain View, CA (US)

(72) Inventors: Mario Anima, Sunnyvale, CA (US); Genevieve Cuevas, Sunnyvale, CA (US); Erin Sosnick Rosenbaum, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/224,821

(22) Filed: Apr. 7, 2021

(65) Prior Publication Data

US 2021/0224141 A1 Jul. 22, 2021

Related U.S. Application Data

(63) Continuation of application No. 16/729,562, filed on Dec. 30, 2019, now Pat. No. 10,977,094, which is a (Continued)

(51) Int. Cl.
*G06F 9/54* (2006.01)
*G06F 16/14* (2019.01)
(Continued)

(52) U.S. Cl.
CPC ............ *G06F 9/54* (2013.01); *G06F 9/541* (2013.01); *G06F 9/543* (2013.01); *G06F 16/14* (2019.01);
(Continued)

(58) Field of Classification Search
None
See application file for complete search history.

(56) References Cited

U.S. PATENT DOCUMENTS

| 7,913,191 B2 | 3/2011 | Asakawa et al. |
| 8,423,405 B1 | 4/2013 | Gopalratnam et al. |

(Continued)

OTHER PUBLICATIONS

Examination Report from from counterpart Application No. 18740939.6, dated Nov. 12, 2020, 12 pp.
(Continued)

*Primary Examiner* — Umut Onat
(74) *Attorney, Agent, or Firm* — Shumaker & Sieffert, P.A.

(57) ABSTRACT

In general, techniques are described that may enable a computing device to recreate data objects formatted specifically for use in a currently executing application based on other data objects formatted in a different manner and specifically for use in a secondary application. For example, the computing device may initially execute a first application. The computing device may execute a second application contains one or more data objects that are specifically formatted for use and display in the second application. The first application may receive a first data object, where a format of the first data object is specific to the second application. The first application may determine content of the first data object and create a second data object that includes at least a portion of the content of the first data object, where a format of the second data object is specific to the first application.

18 Claims, 12 Drawing Sheets

Related U.S. Application Data continuation of application No. 15/851,090, filed on Dec. 21, 2017, now Pat. No. 10,521,278.

(60) Provisional application No. 62/563,609, filed on Sep. 26, 2017.

(51) Int. Cl.
  *G06F 40/18*     (2020.01)
  *G06F 40/109*    (2020.01)
  *G06F 40/151*    (2020.01)
  *G06F 40/166*    (2020.01)
  *G06F 40/169*    (2020.01)
  *G06F 40/186*    (2020.01)

(52) U.S. Cl.
  CPC .......... *G06F 40/109* (2020.01); *G06F 40/151* (2020.01); *G06F 40/166* (2020.01); *G06F 40/169* (2020.01); *G06F 40/18* (2020.01); *G06F 40/186* (2020.01)

(56) References Cited

U.S. PATENT DOCUMENTS

| | | |
|---|---|---|
| 8,584,149 B2 | 11/2013 | Crucs |
| 8,656,265 B1 | 2/2014 | Paulin et al. |
| 10,521,278 B2 | 12/2019 | Anima et al. |
| 10,558,950 B2 | 2/2020 | Anima et al. |
| 10,977,094 B2 * | 4/2021 | Anima ................... G06F 9/541 |
| 2004/0172584 A1 | 9/2004 | Jones et al. |
| 2005/0066335 A1 | 3/2005 | Aarts |
| 2006/0150088 A1 | 7/2006 | Kraft et al. |
| 2009/0006448 A1 | 1/2009 | Pall et al. |
| 2009/0164493 A1 | 6/2009 | Johnsgard |
| 2010/0185696 A1 | 7/2010 | Eggebraaten et al. |
| 2012/0030275 A1 | 2/2012 | Boller et al. |
| 2013/0159984 A1 | 6/2013 | Misovski et al. |
| 2013/0339980 A1 | 12/2013 | Meshar et al. |
| 2014/0136528 A1 | 5/2014 | Anima et al. |
| 2014/0380142 A1 | 12/2014 | Mikutel et al. |
| 2015/0012830 A1 | 1/2015 | Choi et al. |
| 2016/0142358 A1 | 5/2016 | Zunger et al. |
| 2016/0371249 A1 | 12/2016 | Chilakamarri et al. |
| 2017/0147568 A1 | 5/2017 | Chen et al. |
| 2020/0250014 A1 | 8/2020 | Anima et al. |

OTHER PUBLICATIONS

International Search Report and Written Opinion of International Application No. PCT/US2018/037549, dated Sep. 24, 2018, 18 pp.

Paulheim, "Efficient Semantic Event Processing: Lessons Learned in User Interface Intergration," 2010, 15 pp. (Applicant points out, in accordance with MPEP 609.04(a), that the year of publication, 2010, is sufficiently earlier than the effective U.S. filing date, May 15, 2017, so that the particular month of publication is not in issue.).

Prosecution History from U.S. Appl. No. 15/851,090 dated Nov. 8, 2018 through Sep. 27, 2019, 116 pgs.

Response to Communication pursuant to Rules 161 (1) and 162 EPC dated Jan. 9, 2020, filed Jul. 8, 2020, 26 pgs.

Response to Examination Report from from counterpart Application No. 18740939.6, dated Nov. 12, 2020, filed Mar. 12, 2021, 38 pp.

Samsung, "Galaxy Note 4: Using Multi Window and Pop up Window," retrieved from http://www.samsung.com/sa_en/support/skp/faq/1063776, Apr. 30, 2016, 9 pp.

Westenberg, "Drag and Drop Text Between Apps in Multi-window Mode [Diving into Android N]," retrieved from http://www.androidauthority.com/drag-and-drop-text-multi-window-android-n-679164/, Mar. 10, 2016, 3 pp.

Prosecution History from U.S. Appl. No. 16/729,562 dated Jun. 29, 2020 through Mar. 22, 2021, 58 pgs.

Summons to Attend Oral Proceedings Pursuant to Rule 115(1) EPC from counterpart European Application No. 18740939.6 dated Sep. 14, 2021, 16 pp.

\* cited by examiner

| Object | Mass (kg) | Acceleration (m/s²) | Force (N) | | | |
|---|---|---|---|---|---|---|
| Ball | .8 | 10 | | | | |
| Feather | .001 | 2 | | | | |
| Brick | 3.4 | 20 | | | | |

◄─ 610

Force Equation
- Force = Mass x Acceleration

| Object | Mass (kg) | Acceleration (m/s²) | Force (N) | | | |
|---|---|---|---|---|---|---|
| Ball | .8 | 10 | 8 | | | |
| Feather | .001 | 2 | .002 | | | |
| Brick | 3.4 | 20 | 68 | | | |

◄─ 620

Force Equation
- Force = Mass x Acceleration

FIG. 6B ated with a first application. When executed, the instructions cause the at least one processor to receive, from a second application executing at the computing device, a first data object. A format of the first data object is specific to the second application. The first data object includes a first set of one or more data structures. The instructions, when executed, further cause the at least one processor to determine content of the first data object. The instructions, when executed, also cause the at least one processor to create a second data object. A format of the second data object is specific to the first application and different than the format of the first data object. The second data object includes a second set of one or more data structures. The instructions, when executed, further cause the at least one processor to, for at least one data structure

FORMAT-SPECIFIC DATA OBJECT PASSING BETWEEN APPLICATIONS

RELATED APPLICATION

This application is a continuation of U.S. application Ser. No. 16/729,562, filed Dec. 30, 2019, which is a continuation of U.S. application Ser. No. 15/851,090, filed Dec. 21, 2017, which claims the benefit of U.S. Provisional Application No. 62/563,609, filed Sep. 26, 2017, the entire content of which is hereby incorporated by reference.

BACKGROUND

Despite being able to simultaneously execute several applications, applications are designed to execute as isolated instances of the specific application and to change states upon the occurrence of an event (e.g., user input or satisfying some other requirement) within the specific instance of the application. Some applications are capable of communicating with other, different applications, but generally require explicit navigation to relevant data within the respective applications and additional user input to initiate the exchange of data between the applications. A user of a mobile computing device may have to provide input to switch between different application graphical user interfaces (GUIs) to complete a particular task. For example, a user of a computing device may have to cease entering text in a slide presentation application, provide input to cause the device toggle to a note keeping application, manually navigate within the note keeping application in order to locate any note objects that may be relevant to a slide object being edited in the slide presentation application, and provide still yet additional input at a GUI of the note keeping application to select or recreate information that the user may want to finish editing the slide object. Providing several inputs required by some computing devices to perform various tasks can be tedious, repetitive, and time consuming.

SUMMARY

In general, this disclosure is directed to techniques for automatically modifying data objects having application-specific formats when moving information included in the data objects between different applications each of which is associated with a different application-specific data object format. For example, the computing device may execute a first application, such as a slide presentation application. The computing device may also execute a second application, which may be associated with one or more data objects that are each specifically formatted for use and display in a graphical user interface of the second application. For instance, the second application may be a note keeping application, and one or more note documents of the note keeping application may be stored in memory for use within the note keeping application. The first application (e.g., the slide presentation application) may receive a first data object having a note keeping application specific format. Further, the data object may include one or more data structures. For instance, the computing device may receive a user input instructing the computing device to send a note document, formatted specifically for use in the note keeping application, from the note keeping application to the slide presentation application. The first application may create a second data object (e.g., a graphical slide) where a format of the second data object is specific to the first application (e.g., the slide presentation application). For at least one of the one or more data structures of the first data object, the first application may extract the content of the data structure, select a particular data structure of the second data object to place the extracted content, and insert the values of the respective data structure of the first data object into the particular data structure of the second data object. In this way, the second application is passing information to the first application different from prior copy and paste operations, where the user must select specific text to copy from a first document, select a specific place to put the text in the second document, and manually format the pasted text.

Different applications typically have different file formats, data formats, and ways to create data objects that have unique structures and layouts. By automatically modifying data objects in this manner, techniques of this disclosure may provide a way for a user to quickly transfer documents, files, or any other data stored in a data object on the second application to a data object in the first application without requiring the user to manually navigate to relevant content pages within the respective applications, manually recreate the data in the first application, or manually reformat data that is transferred using generic copy-and-paste techniques that stores content to the memory of the computing device. In this way, techniques of this disclosure may reduce the amount of time and the number of user inputs required to transfer data objects between applications, which may simplify the user experience and may reduce power consumption of the computing device.

In one example, the disclosure is directed to a method that includes receiving, by a first application executing at a computing device and from a second application executing at the computing device, a first data object. A format of the first data object is specific to the second application. The first data object includes a first set of one or more data structures. The method also includes creating, by the first application, a second data object that. A format of the second data object is specific to the first application and different than the format of the first data object. The second data object includes a second set of one or more data structures. The method further includes, for at least one data structure of the first set of one or more data structures, extracting, by the first application, one or more values from the respective data structure of the first data object, selecting, by the first application, based on metadata associated with the respective data structure of the first data object, a particular data structure of the second set of one or more data structures for the second data object, and inserting, by the first application, the one or more values from the respective data structure of the first data object into the particular data structure of the second data object.

In another example, the disclosure is directed to a computing device that includes at least one processor and a memory that stores instructions associated with a first application. When executed, the instructions cause the at least one processor to receive, from a second application executing at the computing device, a first data object. A format of the first data object is specific to the second application. The first data object includes a first set of one or more data structures. The instructions, when executed, further cause the at least one processor to determine content of the first data object. The instructions, when executed, also cause the at least one processor to create a second data object. A format of the second data object is specific to the first application and different than the format of the first data object. The second data object includes a second set of one or more data structures. The instructions, when executed, further cause the at least one processor to, for at least one data structure of the first set of one or more data structures, extract one or more values from the respective data structure of the first data object, select, based on metadata associated with the respective data structure of the first data object, a particular data structure of the second set of one or more data structures for the second data object, and insert the one or more values from the respective data structure of the first data object into the particular data structure of the second data object.

In another example, the disclosure is directed to a non-transitory computer-readable storage medium storing instructions that, when executed, cause at least one processor of a computing device to receive, from a second application executing at the computing device, a first data object. A format of the first data object is specific to the second application. The first data object includes a first set of one or more data structures. The instructions, when executed, further cause the at least one processor to determine content of the first data object. The instructions, when executed, also cause the at least one processor to create a second data object. A format of the second data object is specific to the first application and different than the format of the first data object. The second data object includes a second set of one or more data structures. The instructions, when executed, further cause the at least one processor to, for at least one data structure of the first set of one or more data structures, extract one or more values from the respective data structure of the first data object, select, based on metadata associated with the respective data structure of the first data object, a particular data structure of the second set of one or more data structures for the second data object, and insert the one or more values from the respective data structure of the first data object into the particular data structure of the second data object.

In another example, the disclosure is directed to an apparatus that includes means for receiving, from a second application executing at the computing device, a first data object. A format of the first data object is specific to the second application. The first data object includes a first set of one or more data structures. The apparatus further includes means for determining content of the first data object. The apparatus also includes means for creating a second data object. A format of the second data object is specific to the first application and different than the format of the first data object. The second data object includes a second set of one or more data structures. The apparatus further includes, for at least one data structure of the first set of one or more data structures, means for extracting one or more values from the respective data structure of the first data object, means for selecting, based on metadata associated with the respective data structure of the first data object, a particular data structure of the second set of one or more data structures for the second data object, and means for inserting the one or more values from the respective data structure of the first data object into the particular data structure of the second data object.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 6A-6B are conceptual diagrams illustrating another sequence of example user interfaces for an example computing device configured to automatically analyze and modify data objects, formatted for use in a first application, to a second application with a different format, in accordance with one or more aspects of the present disclosure.

DETAILED DESCRIPTION

Figure 1:
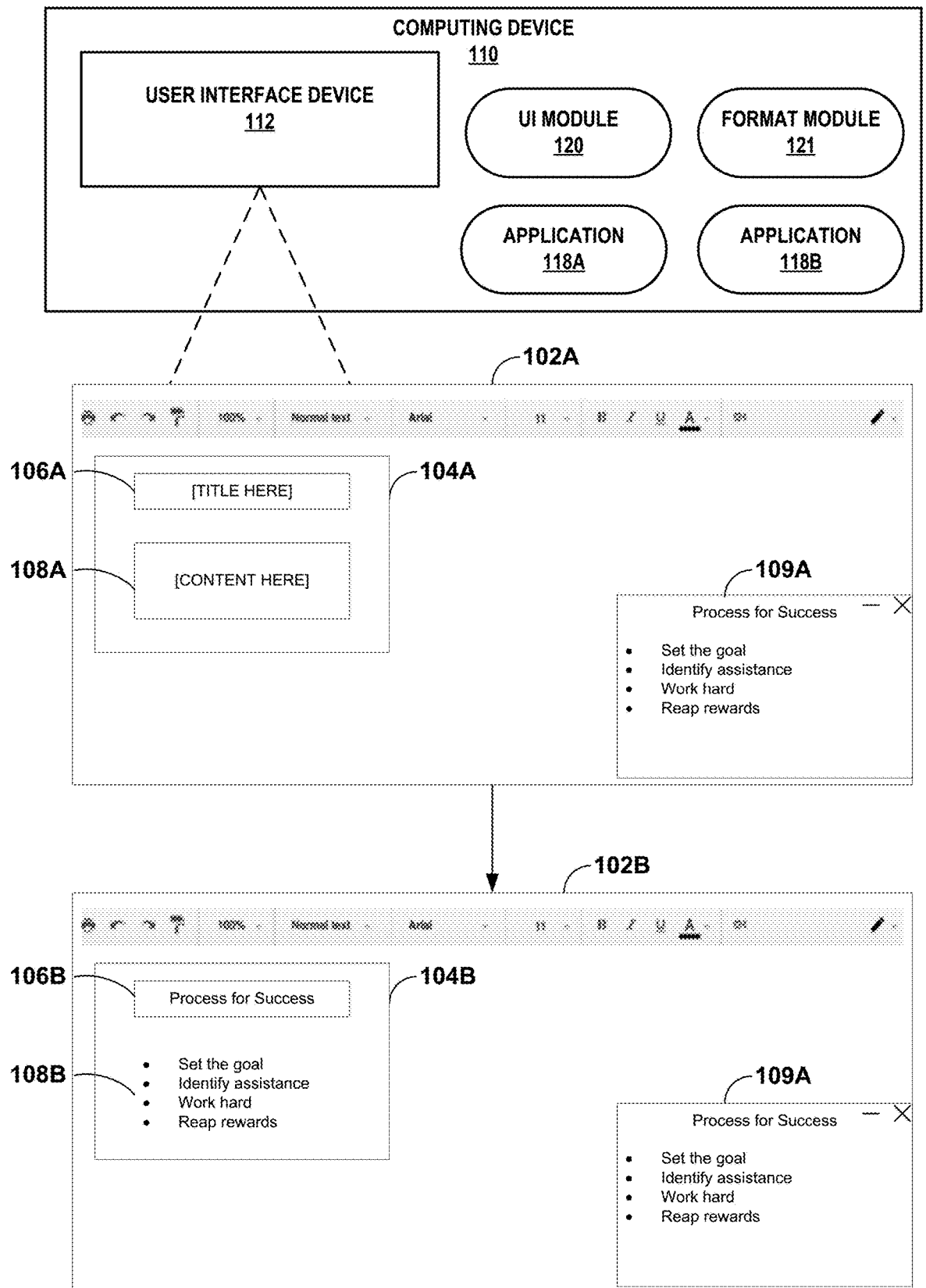
FIG. 1 is a conceptual diagram illustrating an example computing device configured to automatically analyze and modify data objects being passed between applications, in accordance with one or more aspects of the present disclosure.

FIG. 1 is a conceptual diagram illustrating an example computing device 110 configured to automatically analyze and modify data objects being passed between applications, in accordance with one or more aspects of the present disclosure. In the example of FIG. 1, computing device 110 represents an individual mobile or non-mobile computing device. Examples of computing devices 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant device), a personal digital assistants (PDA), a gaming system, a media player, an e-book reader, a mobile television platform, an automobile navigation or infotainment system, or any other type of mobile, non-mobile, wearable, and non-wearable computing device configured to execute multiple applications (e.g., applications 118A and 118B) or otherwise access applications related to a task that computing device 110 is currently performing.

Computing device 110 includes a user interface (UID) 112. UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology.

UID 112 may function as an input device using microphone technologies, infrared sensor technologies, or other input device technology for use in receiving user input. For example, UID 112 may detect, using built-in microphone technology, voice input that UI module 120 and/or context module 122 processes for completing a task. As another example, UID 112 may include a presence-sensitive display that may receive tactile input from a user of computing device 110. UID 112 may receive indications of tactile input by detecting one or more gestures from a user (e.g., the user touching or pointing to one or more locations of UID 112 with a finger or a stylus pen).

UID 112 may function as output (e.g., display) device and present output to a user. UID 112 may function as an output device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. UID 112 may function as output device using speaker technologies, haptic feedback technologies, or other output device technology for use in outputting information to a user. UID 112 may present a user interface (e.g., user interface 102A or 102B) related to applications 118A and 118B and format module 121. UID 112 may present a user interface related to other features of computing platforms, operating systems, applications, and/or services executing at and/or accessible from computing device 110 (e.g., e-mail, chat, online services, telephone, gaming, etc.).

Computing device 110 further includes applications 118A and 118B, user interface (UI) module 120, and format module 121. Applications 118A and 118B and modules 120 and 121 may perform operations described using software, hardware, firmware, or a mixture of hardware, software, and firmware residing in and/or executing at computing device 110. One or more processors of computing device 110, or processors of multiple devices, may execute instructions that are stored at a memory or other non-transitory storage medium of computing device 110 to perform the operations of applications 118A and 118B and modules 120 and 121. Computing device 110 may execute applications 118A and 118B and modules 120 and 121 as virtual machines executing on underlying hardware. Applications 118A and 118B and modules 120 and 121 may execute as one or more services of an operating system or computing platform. Applications 118A and 118B and modules 120 and 121 may execute as one or more executable programs at an application layer of a computing platform.

UI module 120 manages user interactions with UID 112 and other components of computing device 110. In other words, UI module 120 may act as an intermediary between various components of computing device 110 to make determinations based on user input detected by UID 112 and generate output at UID 112 in response to the user input. UI module 120 may receive instructions from an application, service, platform, or other module of computing device 110 to cause UID 112 to output a user interface (e.g., user interface 14A). UI module 120 may manage inputs received by computing device 110 as a user views and interacts with the user interface presented at UID 112 and update the user interface in response to receiving additional instructions from the application, service, platform, or other module of computing device 110 that is processing the user input.

As shown in FIG. 1, user interface 102A is a slide presentation user interface. However, user interface 102A may be any graphical user interface produced during the execution of a first application, such as application 118A. In the example of FIG. 1, user interface 102A includes graphical slide object 104A, titular data structure 106A, and body data structure 108A. Graphical user interface 102A also includes note object 109A, which UI module 120 may generate based on the execution of a second application, such as application 118B In accordance with the techniques of this disclosure, UI module 120 may generate a content page for application 118A, which is currently executing on computing device 110. In the example for FIG. 1, application 118A is a slide presentation application. UI module 120 may also execute application 118B to generate a content page for application 118B, which is also currently executing on computing device 110. In the example of FIG. 1, the content page for application 118A includes graphical slide object 104A, and the content page for application 118B includes note object 109A. The content pages for the respective applications may both be included in user interface 102A.

Format module 121 may receive, from application 118B, a first data object, which format module 121 forwards to application 118A. A format of the first data object is specific to application 118B, and the first data object includes a first set of one or more data structures. For instance, application 118A may receive note object 109A from application 118B. As shown in FIG. 1, note object is shown in a particular format that is specific to application 118B. In other words, note object 109A may be structured such that application 118B may process note object 109A, create note objects similar in structure to note object 109A, and execute specific functions using note object 109A, where other applications, such as application 118A, may not be configured to perform these same actions. Other applications, such as application 118A, may have access to the content stored within such data objects, but in a read-only manner where the other applications may extract content from data structures of the data objects, but may not alter or delete the existing data objects, or create additional data objects.

In response to receiving the first data object, application 118A creates a second data object (e.g., graphical slide object 104B). The second data object includes a second set of one or more data structures. A format of graphical slide object 104B is specific to the application 118A and different than the format of note object 109B. Similar to the relationship between note object 109A and application 118B, graphical slide object 104B may be structured such that application 118A may process graphical slide object 104B, create graphical slide objects similar in structure to graphical slide object 104B, and execute specific functions using graphical slide object 104B, where other applications, such as application 118B, may not be configured to perform these same actions on graphical slide object 104B.

Having the first data object and the second data object, application 118A may process the first data object to extract content from the one or more data structures of the first data object and place the content within the second data object. For instance, for at least one data structure of the first set of one or more data structures of the first object, application 118A may extract one or more values from the respective data structure of the first data object. Using metadata associated with the respective data structure of the first data object (e.g., Extensible Markup Language (XML) tags), application 118A may select a particular data structure of the second set of one or more data structures for the second data object and insert the one or more values from the respective data structure of the first data object into the particular data structure of the second data object.

In the example of FIG. 1, note object 109A includes a header that reads "Process for Success," as well as a sequence of bullet points. All of this data may be included in a single data structure (e.g., one long text string with new line characters, specific spacing characters, bullet point characters, and the text characters), two data structures (e.g., one data structure for the title, and one data structure for the sequence of bullet points), or more than two data structures (e.g., one data structure for the title, and one respective data structure for each bullet point). Depending on the specific data structures within note object 109A, format module 121 may process the content differently. In any case, format module 121 may extract the content from the one or more data structures of note object 109A.

As shown in FIG. 1, format module 121 may take the extracted content from note object 109A and populate data structures of graphical slide object 104B to create a graphical slide object in application 118A. Either using metadata associated with the various data structures of note object 109A or by parsing the extracted content, format module 121 may determine that the phrase "Process for Success" is being used as a header or title of note object 109A. Application 118A may determine that this phrase is the header or title using hard-coded information for note object 109A (e.g., header or title XML tags), or inferential data that indicates how headers and titles typically appear within various documents (e.g., font size, font weight, text alignment, text location, etc.). As such, format module 121 may insert this phrase into titular data structure 106B. Further, format module 121 may determine, using either metadata associated with the various data structures of note object 109A (e.g., body XML tags) or by parsing the extracted content using inferential data that indicates how body text or bulleted lists typically appear within various documents (e.g., font size, font weight, text alignment, text location, bullet point presence, dashes, etc.), that the bulleted list is being used as a body of note object 109A. As such, format module 121 may insert the bulleted list into body data structure 108B. UI module 120 may output user interface 102B for display at UID 112, showing the newly created graphical slide object 104B for application 118A in user interface 102B, along with note object 109A from application 118B.

As appreciated by the techniques described herein, different applications typically have different file formats, data formats, and ways to create data objects that have unique structures and layouts. Typically, in simple file conversions (such as from an editable document to a printed document format file), images of the editable file are taken without the consideration of particular data structures within either file. In copy and paste operations, the user must explicitly select particular content that is to be transferred, manually navigate to a specific portion of the target destination document where the content is to be placed, and manually reformat the transferred content such that it fits within new application. Some other applications enable the user to embed objects unique to one application within that application's files, but they require accessing the outside application. While many applications attempt to provide a universal experience, more specialized applications generally provide the user with greater control over the content and more features to apply to the content. However, a problem inherent to computing is that recreating content in different specialized applications is a tedious, inexact process that requires many manual inputs from the user.

By passing data objects between applications 118A and 118B, techniques of this disclosure may provide a way for a user to quickly transfer documents, files, or any other data stored in a data object within a file for application 118B to a data object within a file for application 118A without requiring the user to manually navigate to relevant content pages within the respective applications, recreate the data in application 118A, or reformat data that is transferred using generic copy-and-paste techniques that stores content to the memory of computing device 110. In this way, techniques of this disclosure may reduce the amount of time and the number of user inputs required to transfer data objects between applications, which may simplify the user experience and may reduce power consumption of computing device 110.

Figure 2:
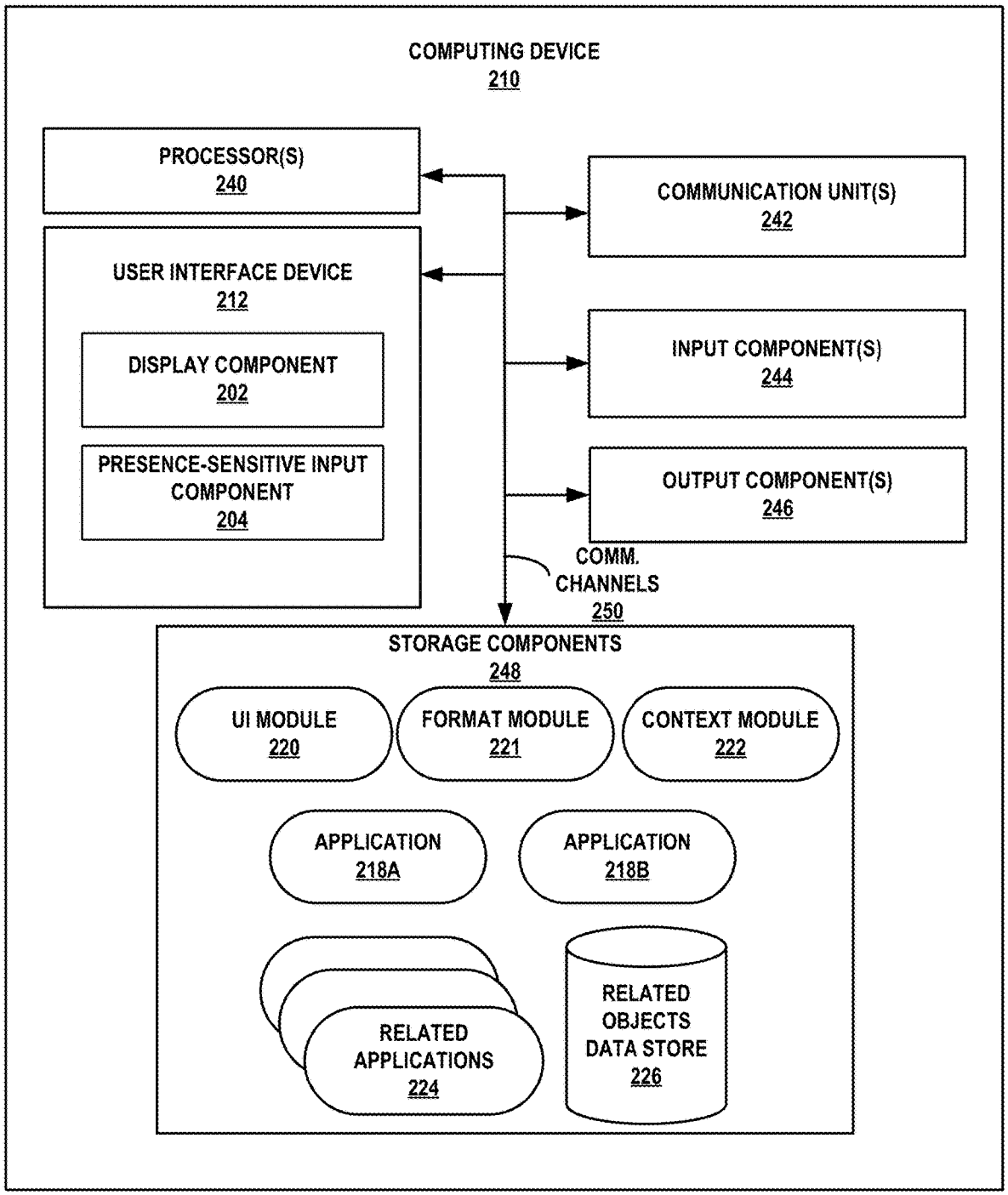
FIG. 2 is a block diagram illustrating an example computing device configured to automatically analyze and modify data objects being passed between applications, in accordance with one or more aspects of the present disclosure.

FIG. 2 is a block diagram illustrating an example computing device configured to automatically analyze and modify data objects being passed between applications, in accordance with one or more aspects of the present disclosure. Computing device 210 of FIG. 2 is described below as an example of computing device 110A and/or 110B of FIG. 1. FIG. 2 illustrates only one particular example of computing device 210, and many other examples of computing device 210 may be used in some instances and may include a subset of the components included in example computing device 210 or may include additional components not shown in FIG. 2.

As shown in the example of FIG. 2, computing device 210 includes user interface device (UID) 212, one or more processors 240, one or more communication units 242, one or more input components 244, one or more output components 246, and one or more storage components 248. UID 212 includes display component 202 and presence-sensitive input component 204. Storage components 248 of computing device 210 include application 218A, application 218B, UI module 220, context module 222, one or more related applications 224, and related objects data store 226.

One or more processors 240 may implement functionality and/or execute instructions associated with computing device 210 to proactively guide the user to information that is related to a task being performed on computing device 210 on application 218A. Examples of processors 240 include application processors, display controllers, auxiliary processors, one or more sensor hubs, and any other hardware configure to function as a processor, a processing unit, or a processing device. Modules 218A, 218B, 220, and 222 may be operable by processors 240 to perform various actions, operations, or functions of computing device 210. For example, processors 240 of computing device 210 may retrieve and execute instructions stored by storage components 248 that cause processors 240 to perform the operations modules 218A, 218B, 220, and 222. The instructions, when executed by processors 240, may cause computing device 210 to provide information about application 218A to application 218B, which determines a context of application 218A and retrieves related data objects based on the context.

UI module 220 may include all functionality of UI module 120 of computing device 110 of FIG. 1 and may perform similar operations as UI module 120 for managing a user interface (e.g., user interfaces 102A and 102B) that computing device 210 provides at UID 212 for example, for facilitating interactions between a user of computing device 110 and applications 218A and 218B. For example, UI module 220 of computing device 210 may receive information from applications 218A and 218B that includes instructions for outputting (e.g., displaying) a companion user interface (e.g., user interface 102B). UI module 220 may receive the information from application 218B over communication channels 250 and use the data to generate a user interface. UI module 220 may transmit a display command and associated data over communication channels 250 to cause UID 212 to present the user interface at UID 212.

Format module 221 may include all functionality of format module 121 of computing device 110 of FIG. 1 and may perform similar operations as format module 121 for executing application 218B. In some examples, format module 221 may execute locally (e.g., at processors 240) to provide functions associated with creating data objects within application 218A. In some examples, format module 221 may act as an interface to a remote companion service accessible to computing device 210. For example, format module 221 may be an interface or application programming interface (API) to a remote version of application 218B.

One or more related applications 224 represent all the various individual applications and services executing at and accessible from computing device 210 that may be accessed by application 218B and context module 222 to provide the user with information and/or perform a task. Numerous examples of related applications 224 may exist and include an e-mail application, a chat or messaging application, a calendar application, a document processing application, a contact storage application, a search application, a map or navigation application, a transportation service application (e.g., a bus or train tracking application), a social media application, an Internet browser application, or any and all other applications that may execute at computing device 210. In general, one or more related applications 224 may include any application in a same suite as application 218A, any application that may exchange data with application 218A, any application developed by a same company as application 218A, or any application that may interact with same contents of a data storage device as application 218A.

As used throughout the disclosure, the term "context" is used to describe any information that can be used by format module 221, context module 222 and application 218B to define a task or details regarding a task that a computing device, and the user of the computing device, may be performing at a particular time using application 218A. For instance, after receiving explicit permission from the user, application 218B may receive information about a current state or a current task being performed using application 218A and determine the context based on the information. In general, application 218B may determine the context based on information in a content page of application 218A, at least a portion of which may be output for display in a graphical user interface. The content page may include various content data objects or content data structures, each of which may include text, images, media, audio, metadata, computer code, or uniform resource locator (URL) information that application 218B may analyze to determine the context of application 218A.

Further to the descriptions throughout this disclosure, a user may be provided with controls allowing the user to make an election as to both if and when systems, programs or features described herein may enable collection of user information (e.g., information about a user's social network, social actions or activities, profession, a user's preferences, or a user's current location) when analyzing an application for a context, and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

One or more storage components 248 within computing device 210 may store information for processing during operation of computing device 210 (e.g., computing device 210 may store data accessed by modules 218A, 218B, 220, 221, and 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 218A, 218B, 220, 221, and 222 and data store 226. Storage components 248 may include a memory configured to store data or other information associated with modules 218A, 218B, 220, 221, and 222 and data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks.

Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, sound card, video graphics adapter card, speaker, cathode ray tube (CRT) monitor, liquid crystal display (LCD), or any other type of device for generating output to a human or machine in a selected modality.

UID 212 of computing device 210 may be similar to UID 112 of computing device 110A and includes display component 202 and presence-sensitive input component 204. Display component 202 may be a screen at which information (e.g., a visual indication) is displayed by UID 212 while presence-sensitive input component 204 may detect a data object at and/or near display component 202.

While illustrated as an internal component of computing device 210, UID 212 may also represent an external component that shares a data path with computing device 210 for transmitting and/or receiving input and output. For instance, in one example, UID 212 represents a built-in component of computing device 210 located within and physically connected to the external packaging of computing device 210 (e.g., a screen on a mobile phone). In another example, UID 212 represents an external component of computing device 210 located outside and physically separated from the packaging or housing of computing device 210 (e.g., a monitor, a projector, etc. that shares a wired and/or wireless data path with computing device 210).

UID 212 of computing device 210 may detect two-dimensional and/or three-dimensional gestures as input from a user of computing device 210. For instance, a sensor of UID 212 may detect a user's movement (e.g., moving a hand, an arm, a pen, a stylus, etc.) within a threshold distance of the sensor of UID 212. UID 212 may determine a two or three-dimensional vector representation of the movement and correlate the vector representation to a gesture input (e.g., a hand-wave, a pinch, a clap, a pen stroke, etc.) that has multiple dimensions. In other words, UID 212 can detect a multi-dimension gesture without requiring the user to gesture at or near a screen or surface at which UID 212 outputs information for display. Instead, UID 212 can detect a multi-dimensional gesture performed at or near a sensor which may or may not be located near the screen or surface at which UID 212 outputs information for display.

In accordance with the techniques of this disclosure, UI module 220 may generate a content page for application 218A, which is currently executing on computing device 210. In the example for FIG. 2, application 218A is a note keeping application. UI module 220 may also execute application 218B to generate a content page for application 218B (e.g., a slide presentation application). In the example of FIG. 2, the content page for application 218A may include one or more note objects, and the content page for application 218B includes one or more graphical slide objects. The content pages for the respective applications may both be included in a user interface.

Format module 221 may receive, from application 218B, a first data object, and forward the first data object to application 218A. A format of the first data object is specific to application 218B, and the first data object includes a first set of one or more data structures. For instance, application 218A may receive one or more graphical slide objects from application 218B. In the example of FIG. 2, the one or more graphical slide objects may be shown in a particular format that is specific to application 218B. In other words, the graphical slide objects may be structured such that application 218B may process the graphical slide objects, create graphical slide objects similar in structure to the graphical slide objects, and execute specific functions using the graphical slide objects, where other applications, such as application 218A, may not be configured to perform these same actions. Other applications, such as application 218A, may have access to the content stored within the graphical slide objects, but in a read-only manner where the other applications may extract content from data structures of the graphical slide objects, but may not alter or delete the existing data objects, or create additional data objects.

In response to receiving the first data object, application 218A creates a second data object (e.g., one or more note objects). The second data object includes a second set of one or more data structures. A format of the one or more created note objects is specific to application 218A and different than the format of the one or more graphical slide objects. Similar to the relationship of the one or more graphical slide objects and application 218B, the one or more note objects may be structured such that application 218A may process the one or more note objects, create note objects similar in structure to the one or more note objects, and execute specific functions using the one or more note objects, where other applications, such as application 218B, may not be configured to perform these same actions.

Having the first data object and the second data object, application 218A may process the first data object to determine and extract content of the first data object (e.g., the one or more graphical slide objects). For instance, for at least one data structure of the first set of one or more data structures of the first object, application 218A may extract one or more values from the respective data structure of the first data object. Using metadata associated with the respective data structure of the first data object (e.g., Extensible Markup Language (XML) tags or inferential data regarding the structure, location, or other characteristics of the content), application 218A may select a particular data structure of the second set of one or more data structures for the second data object that corresponds to the respective data structure and insert the one or more values from the respective data structure of the first data object into the particular data structure of the second data object.

In various examples, each of the one or more graphical slide objects may include various data, such as at least one of a titular sequence of text, a main sequence of text, one or more images, one or more videos, a mathematical equation, and a formatted list. Further, each graphical slide object may include different data structures. All of this data may be included in a single data structure or a plurality of data structures. Depending on the specific data structures within the one or more graphical slide objects, format module 221 may process the content differently. In any case, format module 221 may extract the content from the one or more data structures of one or more of the one or more graphical slide objects.

Application 218A may take the extracted content from the one or more graphical slide objects and populate data structures of one or more note objects to create the one or more note objects in application 218A based on content of the data objects in application 218B. Either using metadata associated with the respective various data structures of the one or more graphical slide objects or by parsing the extracted content, format module 221 may select respective data structure in the one or more note objects that suit the extracted content. For instance, application 218A may determine that a phrase is a header or title using hard-coded information for note object 109A (e.g., header or title XML tags), or inferential data that indicates how headers and titles typically appear within various documents (e.g., font size, font weight, text alignment, text location, etc.). In some examples, in creating the second data object, format module 221 may, for each data structure of the one or more data structures of the first data object, read metadata associated with the respective data structure of the first data object (e.g., the one or more graphical slide objects). Format module 221 may then select, based on the metadata associated with the respective data structure, a particular data structure of one or more data structures of a created note object and insert the one or more values from the respective data structure of the graphical slide object into the particular data structure of the note object.

For instance, the one or more data structures of a particular graphical slide object may include a titular data structure and a body data structure. For the titular data structure of the graphical slide object, format module 221 may select a titular data structure of the created note object and insert one or more values from the titular data structure of the graphical slide object into the titular data structure of the created note object. For the body data structure of the graphical slide object, format module 221 may select a body data structure of the created note object and insert one or more values from the body data structure of the graphical slide object into the body data structure of the created note object.

In some other examples, a particular graphical slide object may include a list of values. As such, format module 221 may create the note object to include either an image of the list of values or a graphical chart that portrays the list of values. This feature may further be used in examples where application 218B is a spreadsheet application that includes a list (e.g., a table) of values. If this list of values is selected to be sent to application 218A, format module 221 may either change the list of values to be an image depicting the values as shown in the spreadsheet application, or create a table based on the values in the list. In other examples, format module 221 may reproduce the list of values to be an editable table of values in a format usable by application 218A.

In some instances, the graphical slide object may include an image. In such examples, format module 221 may conditionally format the image of the first data object based on one or more requirements for images in application 218A. For instance, a note object may be sized to be smaller than a graphical slide object when output for display on UID 212. As such, format module 221 may either crop the selected image or shrink the entire image such that the image will fit within the smaller display size. Format module 221 may also reduce quality, color characteristics, or perform any other image editing function to satisfy any size, color, file size, quality, or any other feature requirement. Format module 221 may then insert the conditionally formatted image into the note object during creation.

In creating the second data object, format module 221 may create, using application 218A, a plurality of data objects that each include at least a portion of a respective data structure of the first data object. The plurality of data objects may include the second data object, and a respective format for each data object in the plurality of data objects may be specific to application 218A and different than the format of the first data object. For instance, in examples where application 218A is a slide presentation application and application 218B is a note keeping application, a note object in application 218B may include a header and a bulleted list (e.g., similar to note object 109A of FIG. 1). In such instances, rather than creating a single graphical slide object that includes the header and the bulleted list, format module 221 may create multiple graphical slide objects that each include a portion of the header and/or bulleted list. For example, a first graphical slide object may include the header of the note object as a main title slide, with each item from the bulleted list being relegated to a distinct graphical slide object with the item shown as a header of the respective graphical slide object with an empty body portion that the user may populate as they see fit. In other examples, format module 221 may create a number of graphical slide objects equal to the number of items in the bulleted list of the note object, with the header of the note object being the header of each graphical slide object, and with a single item of the bulleted list populating a body portion of a particular graphical slide object.

In some examples, the first data object may be included in a plurality of data objects, where each data object in the plurality of data objects includes respective content and respective metadata. For instance, the first data object may be a first value within a spreadsheet, and each data object in the plurality of data objects may be a value under the same header as the first value. In some instances, within application 218B, the one or more data objects within the application may be labelled using descriptive language that is considered metadata for the data object, where each data object with a common label as the first data object is included in the plurality of data objects. Format module 221 may receive, using application 218A, the first data object (e.g., the first value). Format module 221 may select each value with the same respective metadata as the first value (i.e., each value that is under the same header as the first value). Format module 221 may insert, into the second data object, each value under the header that includes the first value. In this way, format module 221 may efficiently move multiple pieces of data between applications 218A and 218B with only a single user interaction, further reducing the time it would take to reproduce data in the alternate application.

In some examples, context module 222 may, prior to format module 221 receiving the first data object, receive, using application 218B, information associated with a content page for the application 218A. At least a first portion of the content page for the first application may be included in a graphical user interface of UID 212. Context module 222 may determine, using application 218B and based on the information associated with the content page for application 218A, a context of application 218A. Context module 222 may determine, using application 218B and based at least in part on the context of application 218A, a respective set of data objects for each application from one or more applications related to application 218A (e.g., related applications 224). The respective set of data objects may include the first data object. UI module 220 may generate, using application 218B and based at least in part on the respective sets of data objects, a content page for application 218B including one or more graphical indications of at least one data object from at least one of the respective sets of data objects. The at least one data object may include the first data object. While at least a second portion of the content page for application 218A is included in the graphical user interface, UI module 220 may output, using application 218B, for display, at least a portion of the content page for application 218B within the graphical user interface of computing device 210.

In other words, application 218B may be a companion application that retrieves data objects from related applications 224. Format module 221 may receive one of the retrieved data objects, determine the content of the received data object, and create a data object within application 218A based on the content of the received data object. Additional details with regards to how application 218B may retrieve these data objects are described below with respect to FIGS. 8-10.

As another example, application 218A may be a spreadsheet application, and the second data object may be one or more cells for the spreadsheet application. In some such examples, the at least one data structure of the first data object may include an equation. Application 218A may further determine that one or more headers for a current document for the spreadsheet application match one or more variables in the equation of the first data object. Based on this match, application 218A may then format the second data object such that the one or more variables in the equation that match the respective one or more headers for the current document are replaced by the matching one or more headers in the equation for the second data object.

While note keeping, spreadsheet, companion, and slide presentation applications have been described above, numerous other types of applications may utilize the techniques described herein. For instance, application 218A or application 218B may be word processing applications, email applications, calendar applications, file storage applications, messaging applications, or any other application that creates data objects based on particular data that may be included in data objects for other applications.

Figure 3A:
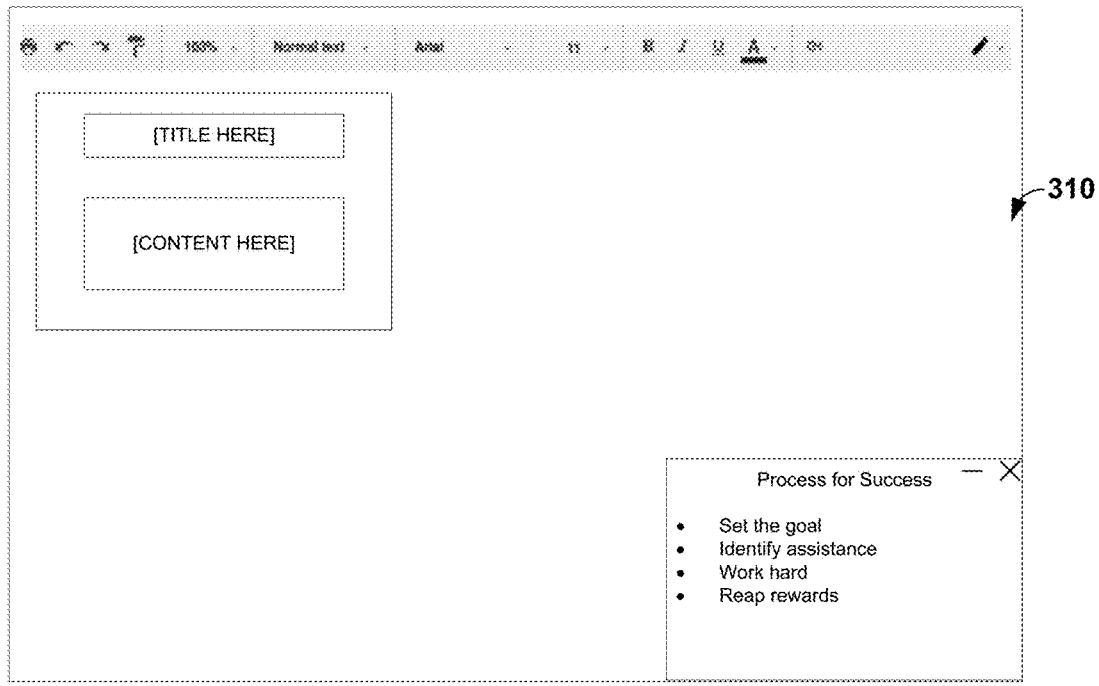
FIGS. 3A-3B are conceptual diagrams illustrating a sequence of example user interfaces for an example computing device configured to automatically analyze and modify data objects, formatted for use in a first application, to a second application with a different format, in accordance with one or more aspects of the present disclosure.
Figure 3B:
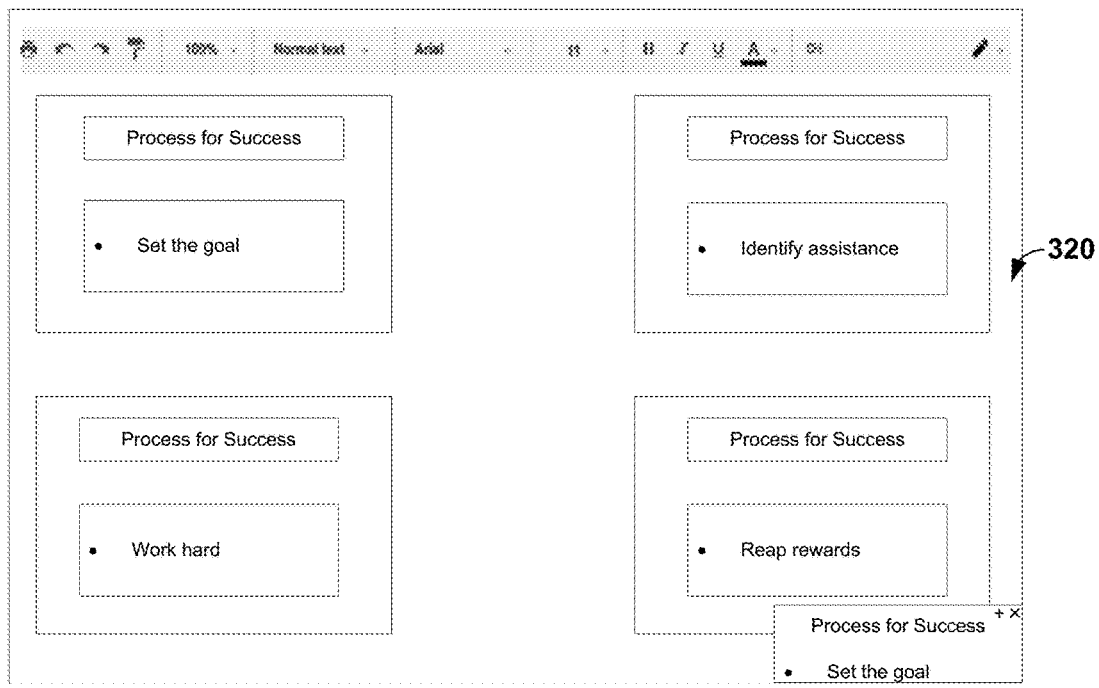

FIGS. 3A-3B are conceptual diagram illustrating a sequence of example user interfaces for an example computing device configured to automatically analyze and modify data objects, formatted for use in a first application, to a second application with a different format, in accordance with one or more aspects of the present disclosure. FIGS. 3A-3B are described below in the context of computing device 110 of FIG. 1. For example, format module 121, while executing at one or more processors of computing device 110, may execute applications 118A and 118B to produce graphical user interfaces 310 and 320, in accordance with one or more aspects of the present disclosure. For purposes of illustration only, FIGS. 3A-3B are described below within the context of computing device 110 of FIG. 1.

In the example of FIG. 3A, computing device 110 may output GUI 310. At the time computing device 110 outputs GUI 310, computing device 110 may be executing two different applications. A first application may be a slide presentation application, and a second application may be a note keeping application. GUI 310 may show content pages associated with each application. The slide presentation application may include slide objects, where a title and a body may each be optionally inserted into the slide. In the example of FIG. 3A, the note keeping application may include a singular note object with a header and a list of text.

The slide presentation application executing on computing device 110 may receive the note object from the note keeping application. The note object, which is formatted specifically for use in the note keeping application, may not be in a form usable by the slide presentation application. As such, the slide presentation application may determine the content of the note object and create multiple slide objects based on the content of the note object. For instance, the multiple created slide objects may each have a title that is the same as the header of the note object. Further, the body of each created slide object may include the content of one of the items in the list in the note object. In other words, the number of slide objects created may be equal to the number of items in the list contained in the note, thereby creating an entire slide presentation from the content of a singular note object. In this way, the slide presentation application reformats the note object such that the content of the note object is in a form usable by the slide presentation application, creating multiple slide objects based on the singular note object. In FIG. 3B, computing device 110 may output GUI 320, which shows the created slide objects that include the content of the note object.

Figure 4A:
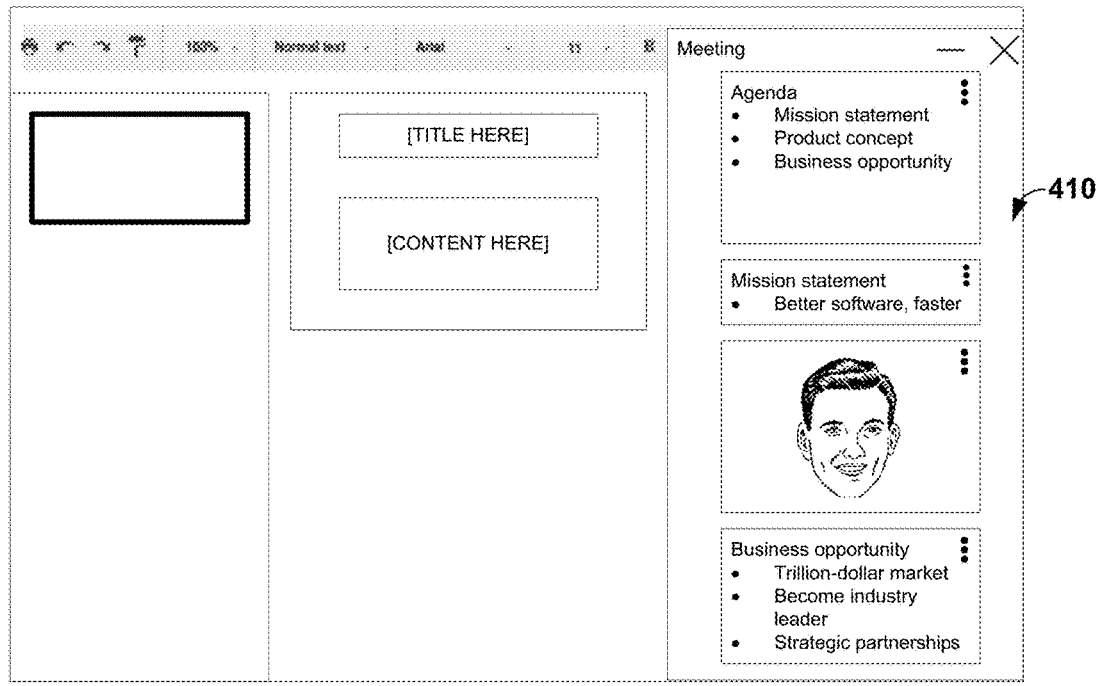
FIGS. 4A-4B are conceptual diagrams illustrating another sequence of example user interfaces for an example computing device configured to automatically analyze and modify data objects, formatted for use in a first application, to a second application with a different format, in accordance with one or more aspects of the present disclosure.
Figure 4B:
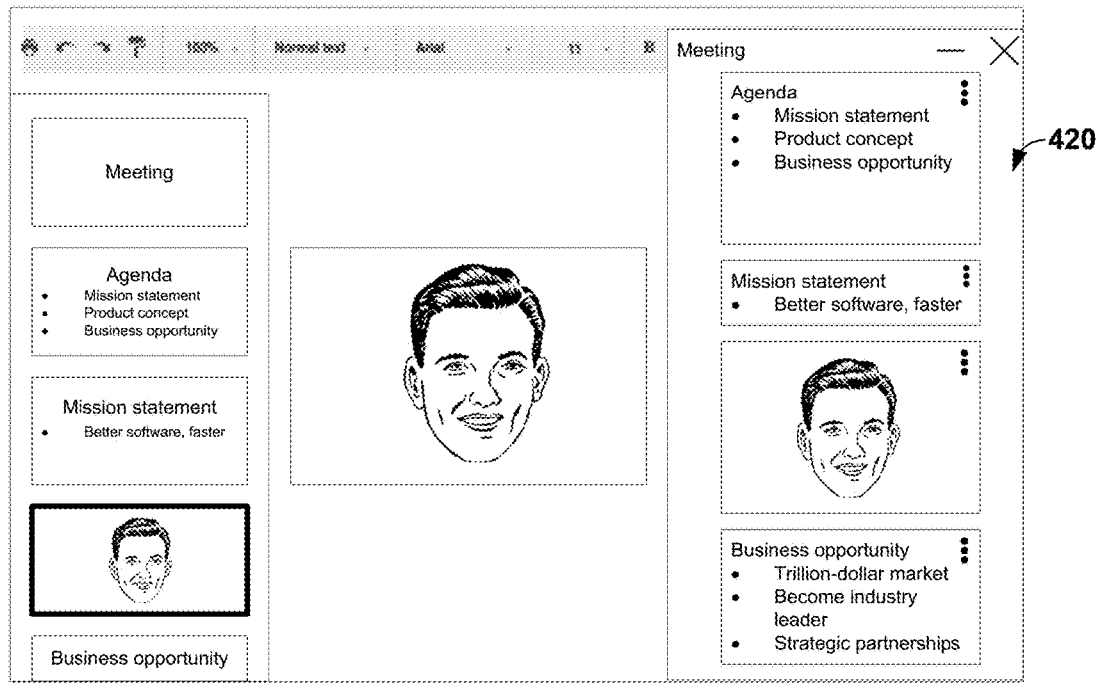

FIGS. 4A-4B are conceptual diagrams illustrating another sequence of example user interfaces for an example computing device configured to automatically analyze and modify data objects, formatted for use in a first application, to a second application with a different format, in accordance with one or more aspects of the present disclosure. FIGS. 4A-4B are described below in the context of computing device 110 of FIG. 1. For example, format module 121, while executing at one or more processors of computing device 110, may execute applications 118A and 118B to produce graphical user interfaces 410 and 420, in accordance with one or more aspects of the present disclosure. For purposes of illustration only, FIGS. 4A-4B are described below within the context of computing device 110 of FIG. 1.

In the example of FIG. 4A, computing device 110 may output GUI 410. At the time computing device 110 outputs GUI 410, computing device 110 may be executing two different applications. A first application may be a slide presentation application, and a second application may be a note keeping application. GUI 410 may show content pages associated with each application. The slide presentation application may include slide objects, where a title and a body may each be optionally inserted into the slide. In the example of FIG. 4A, the note keeping application may include multiple note objects, where some note objects have headers and content, while other note objects have content only. Further, each note object is classified under the main label "meeting."

The slide presentation application executing on computing device 110 may receive the plurality of note object from the note keeping application. The note objects, which are each formatted specifically for use in the note keeping application, may not be in a form usable by the slide presentation application. As such, the slide presentation application may determine the respective content of each of the note objects and create a respective slide object for each of the note objects, with the respective slide object being based on the content of each note object.

For instance, first slide object may include only a title based on the label "meeting" used to group the multiple data objects. Each subsequent slide may be based on the note objects themselves, including the header of the respective note objects (if present) as the title of the particular slide. Further, the body of each created slide object may include the content of one note object from the plurality of note objects. In other words, the number of slide objects created may be equal to the number of note objects associated with the particular label, plus an additional slide object for the label itself, thereby creating an entire slide presentation from the content of a singular note object. In this way, the slide presentation application reformats the note object such that the content of the note object is in a form usable by the slide presentation application, creating multiple slide objects based on the multiple note objects. In FIG. 4B, computing device 110 may output GUI 420, which shows the created slide objects that include the content of the note objects.

Figure 5A:
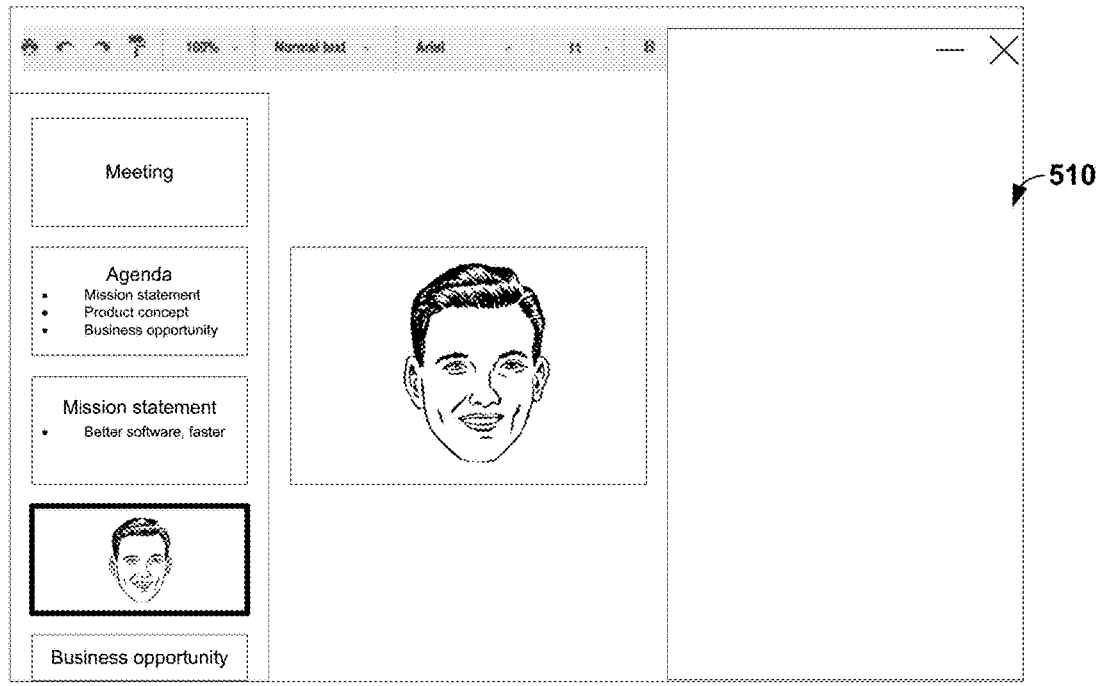
FIGS. 5A-5B are conceptual diagrams illustrating another sequence of example user interfaces for an example computing device configured to automatically analyze and modify data objects, formatted for use in a first application, to a second application with a different format, in accordance with one or more aspects of the present disclosure.
Figure 5B:
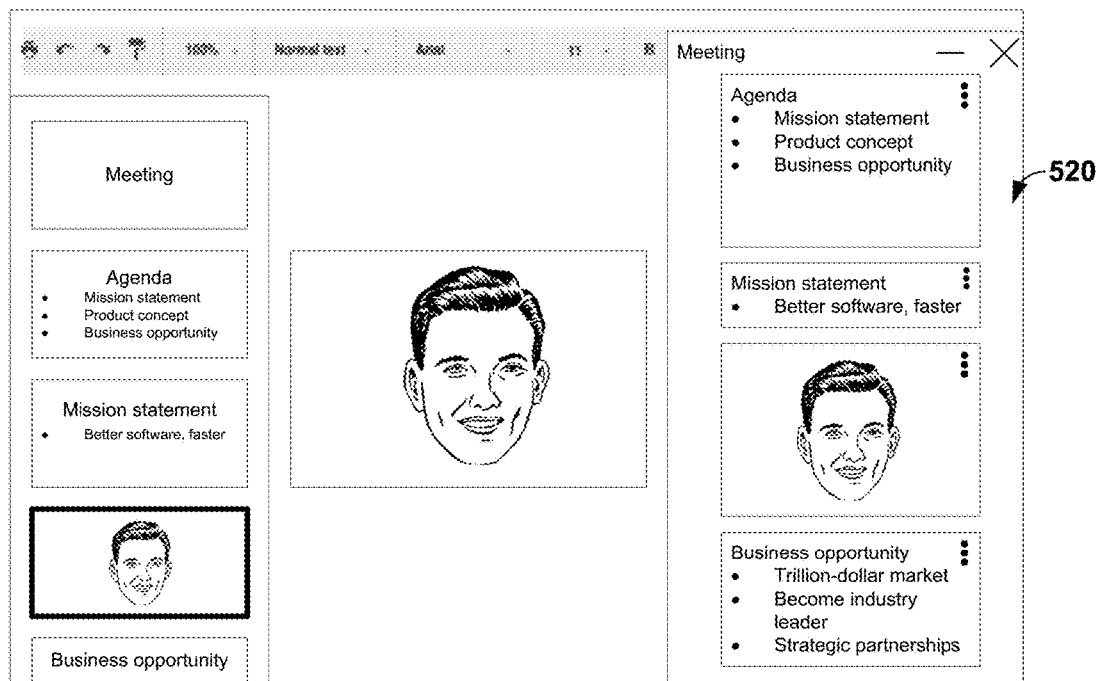

FIGS. 5A-5B are conceptual diagrams illustrating another sequence of example user interfaces for an example computing device configured to automatically analyze and modify data objects, formatted for use in a first application, to a second application with a different format, in accordance with one or more aspects of the present disclosure. FIGS. 5A-5B are described below in the context of computing device 110 of FIG. 1. For example, format module 121, while executing at one or more processors of computing device 110, may execute application 118B to produce graphical user interfaces 510 and 520, in accordance with one or more aspects of the present disclosure. For purposes of illustration only, FIGS. 5A-5B are is described below within the context of computing device 110 of FIG. 1.

While the previous examples each show the creation of slide objects based on note objects, computing device 110 may also perform the inverse of this function. In other words, based on one or more slide objects, computing device 110 may create one or more note objects. In the example of FIG. 5A, computing device 110 may output GUI 510. At the time computing device 110 outputs GUI 510, computing device 110 may be executing two different applications. A first application may be a slide presentation application, and a second application may be a note keeping application. GUI 510 may show content pages associated with each application. In the example of FIG. 5A, the slide presentation application may include multiple slide objects, where some slide objects have titles and body content, while other slide objects have content only. Further, the first slide object includes only a title.

The note keeping application executing on computing device 110 may receive the plurality of slide objects from the slide presentation application. The slide objects, which are each formatted specifically for use in the slide presentation application, may not be in a form usable by the note keeping application. As such, the note keeping application may determine the respective content of each of the slide objects and create a respective note object for each of the slide objects, with the respective note object being based on the content of each slide object.

For instance, first slide object may include only the title "meeting." As such, the note keeping application may label each of the created note objects "meeting." Each note object included under this label may be based on the remaining slide objects, including the title of the respective slide objects (if present) as the header of the particular note object. Further, the body of each created note object may include the content of one slide object from the plurality of slide objects. In this way, the note keeping application reformats the slide objects such that the content of the slide object is in a form usable by the note keeping application, creating multiple note objects based on the multiple slide objects. In FIG. 5B, computing device 110 may output GUI 520, which shows the created slide objects that include the content of the note objects.

FIGS. 6A-6B are conceptual diagrams illustrating another sequence of example user interfaces for an example computing device configured to automatically analyze and modify data objects, formatted for use in a first application, to a second application with a different format, in accordance with one or more aspects of the present disclosure. FIGS. 6A-6B are described below in the context of computing device 110 of FIG. 1. For example, format module 121, while executing at one or more processors of computing device 110, may execute applications 118A and 118B to produce graphical user interfaces 610 and 620, in accordance with one or more aspects of the present disclosure. For purposes of illustration only, FIGS. 6A-6B are described below within the context of computing device 110 of FIG. 1.

As shown in FIG. 6A, additional applications other than slide presentation applications or note keeping applications may utilize the techniques described herein. For instance, in the example of FIG. 6A, the first application may be a spreadsheet application, and the second application may be the note keeping application.

In the example of FIG. 6A, computing device 110 may output GUI 610. GUI 610 may show content pages associated with each application. In the example of FIG. 6A, the spreadsheet application may include multiple cell objects with content already placed in them. Four of the cell objects in GUI 610 are header cell objects (i.e., the cells that include the text "Object," "Mass (kg)," "Acceleration (m/s$^2$)," and "Force (N)." Further, in the example of FIG. 6A, the note keeping application may include a singular note object that includes the equation "Force=Mass×Acceleration."

The spreadsheet application executing on computing device 110 may receive the note object from the note keeping application. The note object, which is formatted specifically for use in the note keeping application, may not be in a form usable by the spreadsheet application. As such, the spreadsheet application may determine the content of the note object and create one or more cell objects based on the content of the note object.

For instance, in the example of FIG. 6B, computing device 110 may create three cell objects based on the equation in the note object. Computing device 110 may determine that the variables in the equation of the note object match two of the headers present in the already-populated cell objects (i.e., mass and acceleration). As such, computing device 110 may replace the variables in the equation with references to the columns in the spreadsheet that match the listed variables. Further, computing device 110 may determine that the product in the equation matches a third header (i.e., force). As such, computing device 110 may insert the reformatted equation into the "Force" column in one or more of the rows that have content in the remaining cells. In this way, the spreadsheet application reformats the note object such that the content of the note object is in a form usable by the spreadsheet application, converting the equation into a form recognized by the spreadsheet application. Computing device 110 may output GUI 620, which shows the created cell objects that include the content of the note object.

Figure 7:
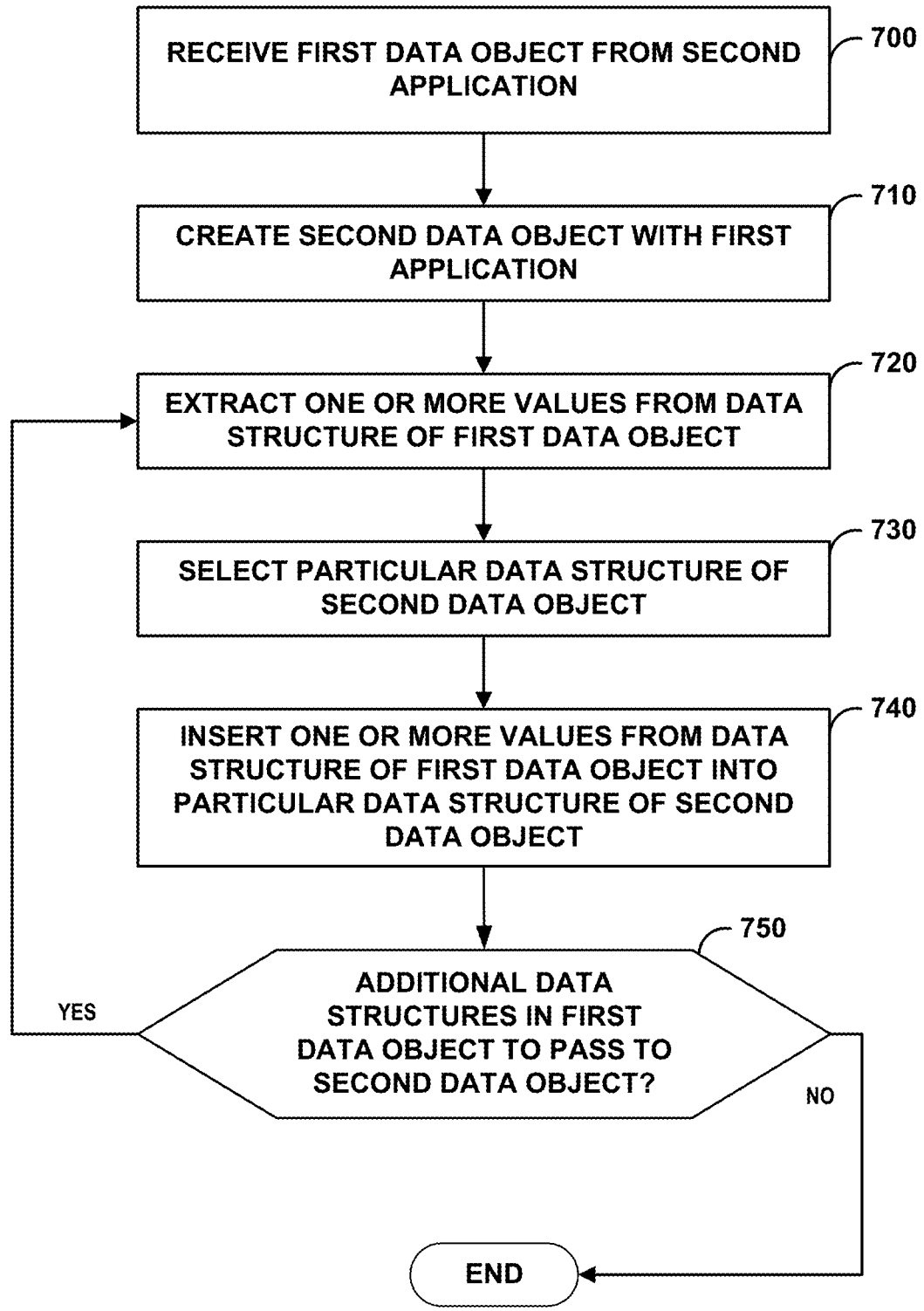
FIG. 7 is a flowchart illustrating example operations of an example computing device configured to automatically analyze and modify data objects, formatted for use in a first application, to a second application with a different format, in accordance with one or more aspects of the present disclosure.
Figure 10:
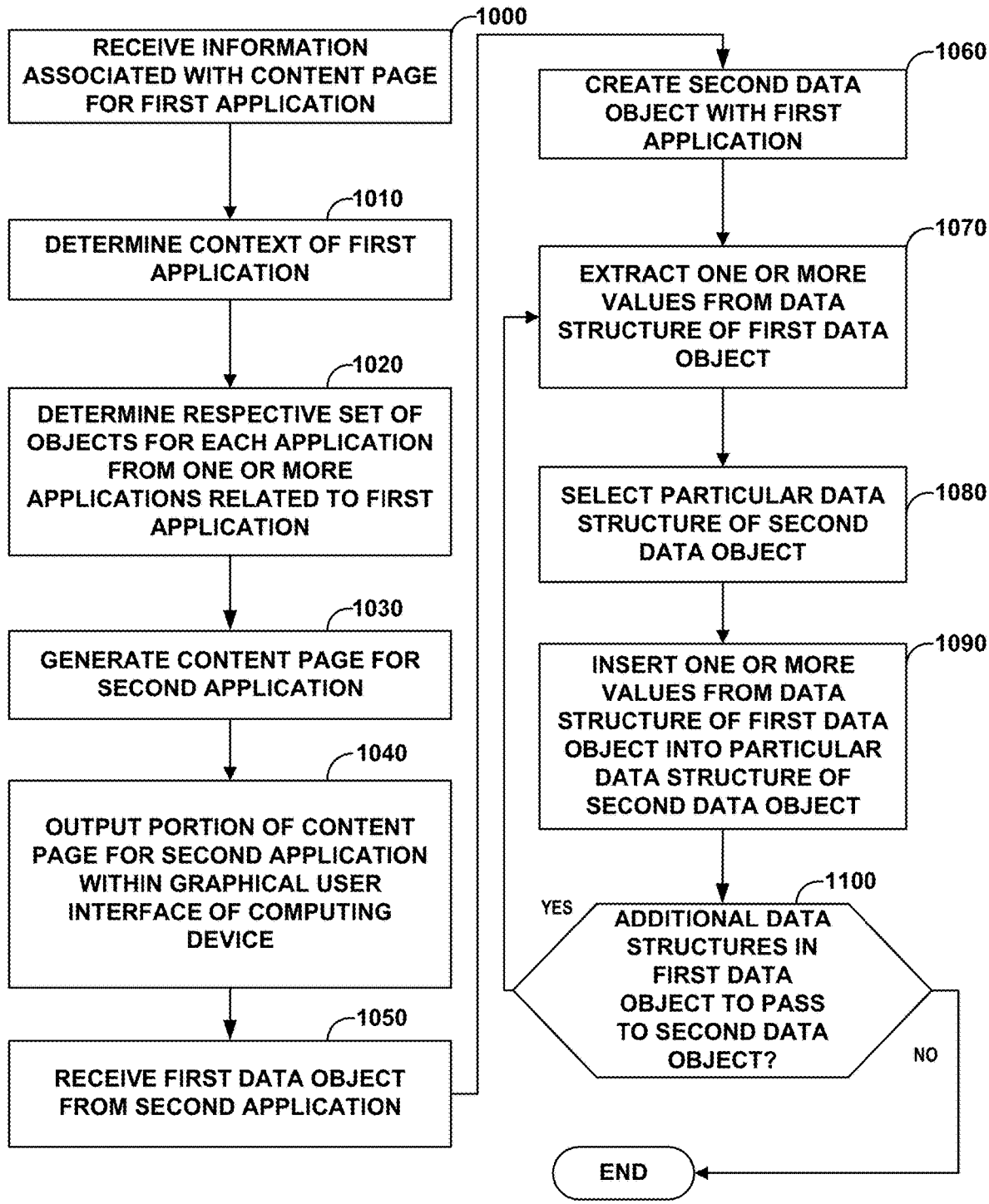
FIG. 10 is a flowchart illustrating further example operations of an example computing device configured to identify and display information determined to be relevant to a task being performed, in accordance with one or more aspects of the present disclosure.

FIG. 7 is a flowchart illustrating further example operations of an example computing device configured to pass a data object, formatted for use in a first application, to a second application with a different format, in accordance with one or more aspects of the present disclosure. FIG. 7 is described below in the context of computing device 110 of FIG. 1. For example, format module 121, while executing at one or more processors of computing device 110, may execute application 118B to perform operations 700-720, in accordance with one or more aspects of the present disclosure. For purposes of illustration only, FIG. 10 is described below within the context of computing device 110 of FIG. 1.

In accordance with the techniques of this disclosure, computing device 110 receives, using a first application executing at computing device 110 and from a second application executing at computing device 110, a first data object (700). A format of the first data object may be specific to the second application, and the first data object may include a first set of one or more data structures. In some instances, the one or more values of at least one data structure of the first data object may include at least one of a titular sequence of text, a main sequence of text, one or more images, one or more videos, a mathematical equation, and a formatted list. Using a first application, computing device 110 may classify the content as one of these types of content based on metadata associated with the at least one data structure of the first object, the metadata including hard-coded tags (e.g., XML tags) or inferential data corresponding to the structure, layout, or visual characteristics of the content.

Computing device 110, using the first application, creates a second data object (710). The second data object may be formatted specifically for the first application and differently than the first data object. The second data object may include a second set of one or more data structures.

For at least one data structure of the first set of one or more data structures, computing device 110 may extract one or more values from the respective data structure of the first data object (720). Based on metadata associated with the respective data structure of the first data object, computing device 110 may select a particular data structure of the second set of one or more data structures for the second data object (730). Computing device 110 may then insert the one or more values from the respective data structure of the first data object into the particular data structure of the second data object (740). In some examples, computing device 110 may output, for display, a graphical user interface that includes at least a portion of the content of the second data object.

Computing device 110 may determine whether another data structure of the first data object is to be included in the second data object (750). If computing device 110 determines that there is another data structure of the first data object to be included in the second data object (YES branch of 750), computing device 110 may repeat the process (steps 720-740) for extracting content from the data structure and inserting the content into a data structure in the second data object. If computing device 110 determines that there is not another data structure of the first data object to be included in the second data object (NO branch of 750), computing device 110 may terminate the process.

For instance, the one or more data structures of the first data object may include a titular data structure and a body data structure. For the titular data structure of the first data object, computing device 110 may select a titular data structure of the second data object and insert one or more values from the titular data structure of the first data object into the titular data structure of the second data object. For the body data structure of the first data object, computing device 110 may select a body data structure of the second data object and insert one or more values from the body data structure of the first data object into the body data structure of the second data object.

As another example, the first application is a spreadsheet application, and the second data object may be one or more cells for the spreadsheet application. In some such examples, in determining the content of the first data object, computing device 110 determines that the content of the first data object includes an equation. Computing device 110 may determine that one or more headers for a current document for the spreadsheet application match one or more variables in the equation. Computing device 110 may then format the second data object such that the one or more variables in the equation that match the respective one or more headers for the current document are replaced by the matching one or more headers in the equation for the second data object.

The first data object may also include a data structure for a list of values. As such, computing device 110 may create the second data object to be either an image of the list of values or a graphical chart that portrays the list of values.

The first data object may also include a data structure for an image. In such examples, computing device 110 may conditionally format the image of the first data object based on one or more requirements for images in the first application. Computing device 110 may then insert the conditionally formatted image into the second data object during creation.

In creating the second data object, computing device 110 may create, using the first application, a plurality of data objects that each include at least a portion of a respective data structure of the first data object. The plurality of data objects may include the second data object, and a respective format for each data object in the plurality of data objects may be specific to the first application and different than the format of the first data object.

The first application may also include a slide presentation application, with the second data object being one or more graphical slides for the slide presentation application. The second application may be a note keeping application, and the first data object is one or more note objects for the note keeping application. In other examples, the first application may be a note keeping application, the second data object may be one or more note objects for the note keeping application, the second application may be a slide presentation application, and the first data object may be one or more note graphical slides for the note keeping application.

The first data object may be included in a plurality of data objects, where each data object in the plurality of data objects comprises respective content and respective metadata. Computing device 110 may further receive, using the first application, the plurality of data objects. Computing device 110 may select, using the first application, each data object of the plurality of data objects with the same respective metadata as the first data object. Computing device 110 may insert, using the first application, into the second data object, the one or more values of the at least one data structure of the first data object and one or more respective values of one or more respective data structures of each data object of the plurality of data objects with the same respective metadata as the first data object.

Computing device 110 may, prior to receiving the first data object, receive, using the second application, information associated with a content page for the first application executing at the computing device. At least a first portion of the content page for the first application may be included in a graphical user interface of computing device 110. Computing device 110 may determine, using the second application and based on the information associated with the content page for the first application, a context of the first application. Computing device 110 may determine, using the second application and based at least in part on the context of the first application, a respective set of data objects for each application from one or more applications related to the first application. The respective set of data objects may include the first data object. Computing device 110 may generate, using the second application and based at least in part on the respective sets of data objects, a content page for the second application including one or more graphical indications of at least one data object from at least one of the respective sets of data objects. The at least one data object may include the first data object. While at least a second portion of the content page for the first application is included in the graphical user interface, computing device 110 may output, using the second application, for display, at least a portion of the content page for the second application within the graphical user interface of computing device 110.

In determining the context of the second application, computing device 110 may, using the second application, identify one or more content objects in the content page for the first application, extract at least one respective property of each of the one or more content objects, and determine, based at least in part on one or more properties of the at least one respective property of each of the one or more content objects, the context of the first application. The one or more content objects may include one or more of text, images, metadata, an application state, application code, field identifiers, file names, or file types.

In determining the respective set of data objects for each application from the one or more applications related to the first application, computing device 110 may, using the second application, construct, based on the context, a respective search query for each of the one or more applications related to the first application, and execute each respective search query from the respective search queries to retrieve the respective set of data objects from data of a corresponding application from the one or more applications related to the first application.

The one or more applications related to the first application may include at least two applications related to the first application, and, in generating the content page for the first application, computing device 110 may generate, using the second application and based at least in part on the respective sets of data objects for the at least two applications related to the first application, the content page for the second application including at least one graphical indication of at least one data object from the respective sets of data objects for each application from the at least two applications related to the first application.

Computing device 110 may further receive, using the second application, an indication of user input selecting a first graphical indication of the first data object from the one or more graphical indications of the at least one data object included in the content page for the second application. Using the second application, computing device 110 may send the first data object to the first application.

Computing device 110 may further, using the second application, receive an indication of a selection of one or more graphical indications representing one or more content objects included in the content page of the first application, determine, based on the one or more content objects, an updated context of the first application, determine, based at least in part on the updated context of the first application, a respective updated set of data objects for each application from the one or more applications related to the first application, generate, based at least in part on the respective updated sets of data objects, an updated content page for the first application including one or more graphical indications of at least one data object from at least one of the respective updated sets of data objects, and, while at least a third portion of the content page for the first application is included in the graphical user interface, output, for display, a portion of the updated content page for the second application within the graphical user interface of computing device 110.

In outputting the portion of the content page for the second application, computing device 110 may, while at least the second portion of the content page for the first application is included in the graphical user interface, replace, using the second application, a portion of the graphical user interface with the portion of the content page for the first application.

The portion of the content page for the second application that is output for display includes one or more graphical indications of at least one data object from a first set of data objects for an application from the one or more applications related to the first application. Computing device 110 may further receive an indication of user input selecting a different application from the one or more applications related to the first application. Computing device 110 may generate, based at least in part on the respective sets of data objects, an updated content page for the first application including one or more graphical indications of at least one data object from a second set of data objects for the different application from the one or more applications related to the first application. While at least the second portion of the content page for the first application is included in the graphical user interface, computing device 110 may output, for display, a portion of the updated content page for the second application within the graphical user interface of the computing device.

Computing device 110 may, prior to determining the context, receive an indication of user input to begin executing the second application, and responsive to receiving the indication of user input, determine, using the second application, the context. In some examples, the second application may be a companion application.

Figure 8:
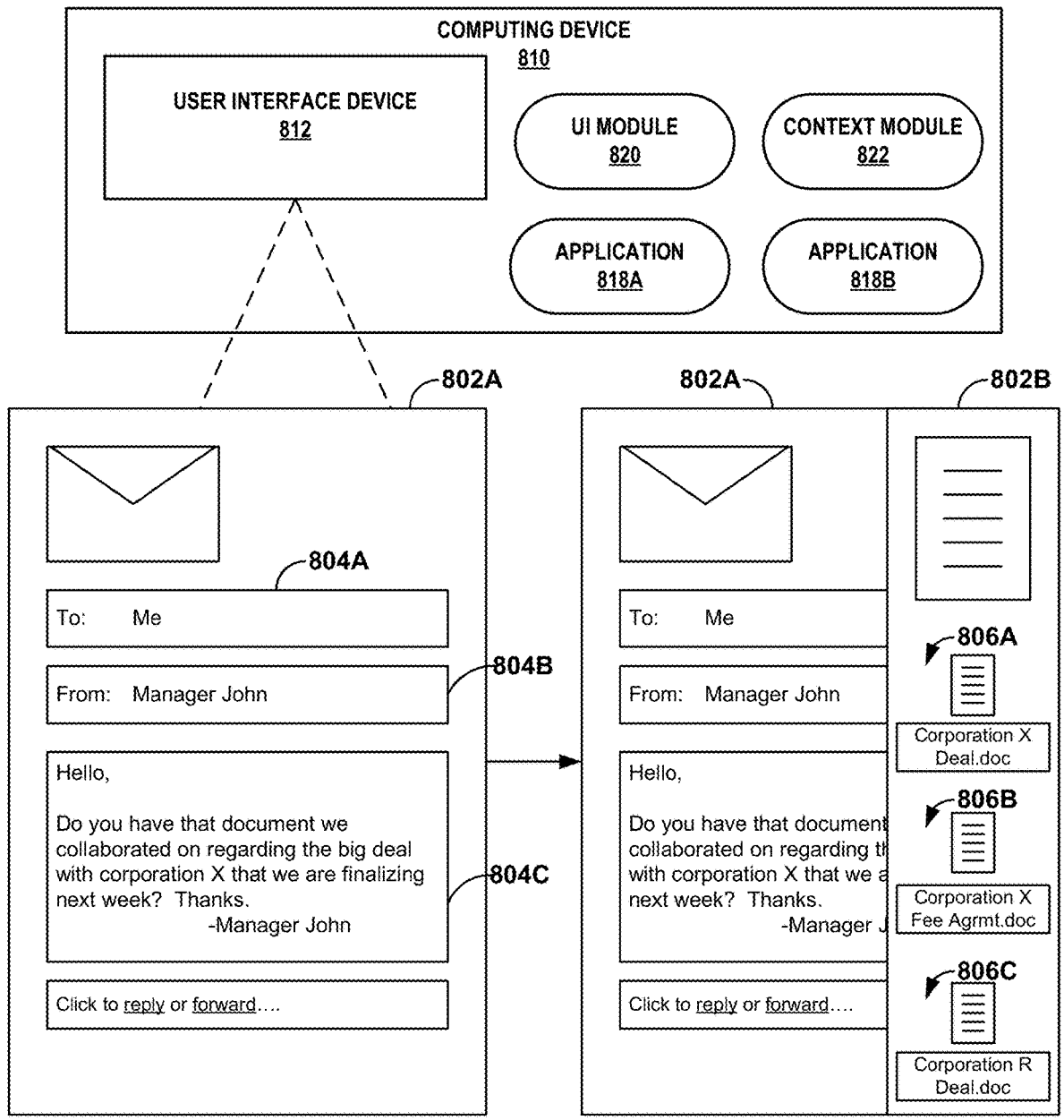
FIG. 8 is a conceptual diagram illustrating an example computing device configured to identify and display information determined to be relevant to a task being performed, in accordance with one or more aspects of the present disclosure.

FIG. 8 is a conceptual diagram illustrating an example computing device 810 configured to identify and display information determined to be relevant to a task being performed, in accordance with one or more aspects of the present disclosure. In the example of FIG. 8, computing device 810 may be, and include components, similar to computing device 110 of FIG. 1. Computing device 810 includes UID 812, which may be similar to UID 112 of FIG. 1. The example of FIG. 8 shows an example where the data object being passed to application 818A originates from a companion application, which may identify and display information from one or more related applications determined to be relevant to a task being performed.

Computing device 810 further includes applications 818A and 818B, user interface (UI) module 820, and context module 822. Applications 818A and 818B and modules 820 and 822 may perform operations described using software, hardware, firmware, or a mixture of hardware, software, and firmware residing in and/or executing at computing device 810. One or more processors of computing device 810, or processors of multiple devices, may execute instructions that are stored at a memory or other non-transitory storage medium of computing device 810 to perform the operations of applications 818A and 818B and modules 820 and 822. Computing device 810 may execute applications 818A and 818B and modules 820 and 822 as virtual machines executing on underlying hardware. Applications 818A and 818B and modules 820 and 822 may execute as one or more services of an operating system or computing platform. Applications 818A and 818B and modules 820 and 822 may execute as one or more executable programs at an application layer of a computing platform.

UI module 820 manages user interactions with UID 812 and other components of computing device 810. In other words, UI module 820 may act as an intermediary between various components of computing device 810 to make determinations based on user input detected by UID 812 and generate output at UID 812 in response to the user input. UI module 820 may receive instructions from an application, service, platform, or other module of computing device 810 to cause UID 812 to output a user interface (e.g., user interface 802A). UI module 820 may manage inputs received by computing device 810 as a user views and interacts with the user interface presented at UID 812 and update the user interface in response to receiving additional instructions from the application, service, platform, or other module of computing device 810 that is processing the user input.

As shown in FIG. 8, user interface 802A is an email user interface. However, user interface 802A may be any graphical user interface produced during the execution of a first application, such as application 818A. In the example of FIG. 8, user interface 802A includes content object 804A (i.e., the "to" field of the email correspondence), content object 804B (i.e., the "from" field of the email correspondence), and content object 804C (i.e., the body of the email correspondence).

In accordance with the techniques of this disclosure, UI module 820 may execute application 818A generate a content page for application 818A, which is currently executing on computing device 810. In the example for FIG. 8, application 818A is an email application that is part of a web suite of applications. The content page for the email application may include a "To" field, a "From" field, a subject line, an email body area, a listing of emails, additional content in the chain of emails, or any additional content related to a user's email inbox or outbox, including text, images, metadata, an application state, application code, field identifiers, file names, or file types.

UI module 820 may output, for display via UID 812, graphical user interface 802A that includes at least a portion of the content page for application 818A. In the example of FIG. 8, the portion of the content page included in graphical user interface 802A consists of content object 804A (i.e., the "to" field of the email correspondence), content object 804B (i.e., the "from" field of the email correspondence), and content object 804C (i.e., the body of the email correspondence). However, in other examples, UI module 820 may output more content objects or less content objects based on the graphical real estate available in UID 812 and the amount of content contained within each content object.

After receiving explicit permission from the user to do so, context module 822 may execute application 818B to receive information associated with the content page for application 818A. Context module 822 may then execute application 818B to determine, based on the content page for application 818A, a context of application 818A for application 818B. The context may include any information regarding a current state of application 818A that may provide an indication of a current task being performed within application 818A, a future task to be performed within application 818A, or any other information relevant to application 818A. For instance, prior to executing application 818B, UI module 820 may output a request for explicit user permission to execute application 818B and transfer the information associated with the content page for 818A. After receiving the explicit permission to do so, context module 822 may begin executing application 818B. If explicit permission is denied, context module 822 may instead refrain from executing application 818B.

In the example of FIG. 8, context module 822 may determine that content object 804A indicates that the current email correspondence is a received email addressed to the user of computing device 810. Context module 822 may further determine that content object 804B indicates that the user's boss, "Manager John", is the author of the current email correspondence and that the email is, therefore, likely work related. Finally, context module 822 may further determine that content object 804C indicates that the user's boss is requesting a document authored by both the user and the boss regarding a deal with corporation X.

While the example of FIG. 8 describes context module 822 using content objects that UI module 820 is currently outputting for display via UID 812, context module 822 may analyze any content objects within the content page in the context determination process, including content objects that UI module 820 is not currently outputting for display but are on the same content page. For instance, content object 804C may be a reply to a previous email chain, which is included on the content page but off-screen. Context module 822 may use the previous email chain as additional data when determining the context of application 818A.

Based at least in part on the context of application 818A, context module 822 may execute application 818B to determine a respective set of data objects for each application from one or more applications related to application 818A. For instance, application 818A, the email application, may be a part of a web suite of applications. Application 818B may be configured to access data from other applications within the same web suite, which would be related to application 818A. In some instances, any application that may exchange data with application 818A may be considered a related application. Further, any application developed by a same company as application 818A may be considered a related application. In some instances, any application that may interact with same contents of a data storage device as application 818A may be considered a related application.

In the example of FIG. 8, application 818B determined the context of application 818A to be that the user is reviewing an email exchange with the user's boss in order to find a specific document that the user and the user's boss collaborated on drafting. Context module 822 may then execute application 818B to search for documents within a document editing/storage application related to application 818A based on the determined context (e.g., a document regarding corporation X and a deal that is occurring with said corporation X). Application 818B may retrieve a list of documents associated with the related document editing/storage application that include references to corporation X, deals that the user's business is a party to, documents that are co-authored by the user and the user's boss, etc.

Application 818B may forward the list of retrieved data objects to UI module 820, which may generate a content page for application 818B that includes one or more graphical indications of at least one data object from at least one of the respective sets of data objects. The content page may include a portion of or the entirety of the set of data objects retrieved by application 818B. UI module 820 may then output, for display at UID 812, graphical user interface 802B that includes at least a portion of the content page for application 818B while at least a portion of graphical user interface 802A is displayed.

For instance, application 818B may retrieve a set of ten documents that are related to either corporation X, a deal that the user is a party to, or that are co-authored by the user and the user's boss. Application 818B may sort the documents based on how closely the documents match the determined context. In the example of FIG. 8, document 806A, titled "Corporation X Deal.doc," may be a document co-authored by the user and the user's boss regarding a deal between the user's company and corporation X. Document 806B, titled "Corporation X Fee Agreement.doc," may be a document co-authored by the user and the user's boss regarding a previous fee agreement between the user's company and corporation X. Document 806C, titled "Corporation R Deal.doc," may be a document authored by the user regarding a deal between the user's company and corporation R. UI module 820 may determine that UID 812 is large enough to display three of the ten documents. UI module 820 may output graphical user interface 802B as showing the top three documents, or the three documents ranked highest in the ranked list that application 818B previously generated (i.e., documents 806A-806C), of the ten total retrieved documents. Graphical user interface 802B may be scrollable such that each of the other seven documents not initially shown in graphical user interface 802B may be displayed to the user.

By utilizing application 818B to determine contextual information of application 818A executing on computing device 810, computing device 810 may provide a way for a user to quickly obtain documents, files, or any other stored data object determined to be relevant to the task being performed by application 818A on computing device 810 without requiring the user to switch between several different applications, manually navigate to relevant content pages within the respective applications, or discern what input is necessary to move the data objects between the two different applications. For instance, in the example of FIG. 8, the user may drag document 806A, the likely document requested by the user's boss, into the reply field of application 818A's graphical user interface to attach the requested document to a reply email. In this way, techniques of this disclosure may reduce the amount of time and the number of user inputs required to retrieve relevant data objects in other applications, which may simplify the user experience and may reduce power consumption of computing device 810.

By providing contextual information associated with application 818A to application 818B, techniques of this disclosure may provide a way for a user to quickly obtain documents, files, or any other data determined to be relevant to the task being performed using application 818A without requiring the user to switch between several different applications, manually navigate to relevant content pages within the respective applications, or discern what input is necessary to move the data objects between the two different applications. In this way, techniques of this disclosure may reduce the amount of time and the number of user inputs required to retrieve relevant data objects from other applications, which may simplify the user experience and may reduce power consumption of computing device 810.

Figure 9A:
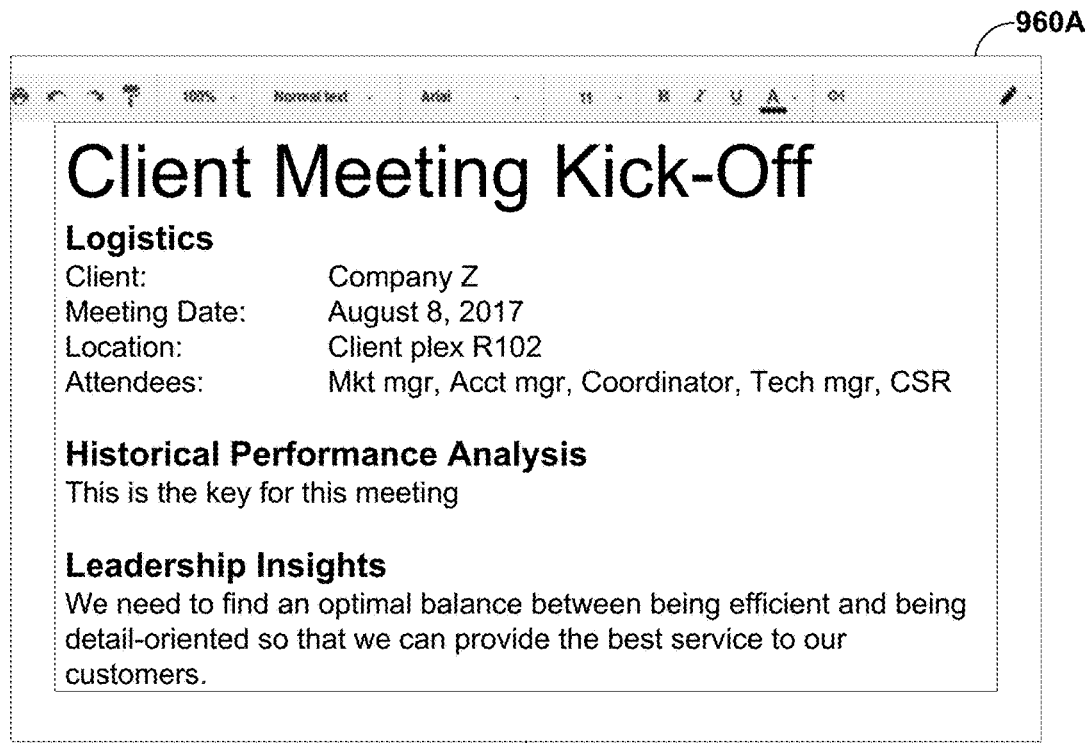
FIGS. 9A-9E are conceptual diagrams illustrating a sequence of user interfaces for an example computing device configured to identify and display information determined to be relevant to a task being performed, in accordance with one or more aspects of the present disclosure.
Figure 9B:
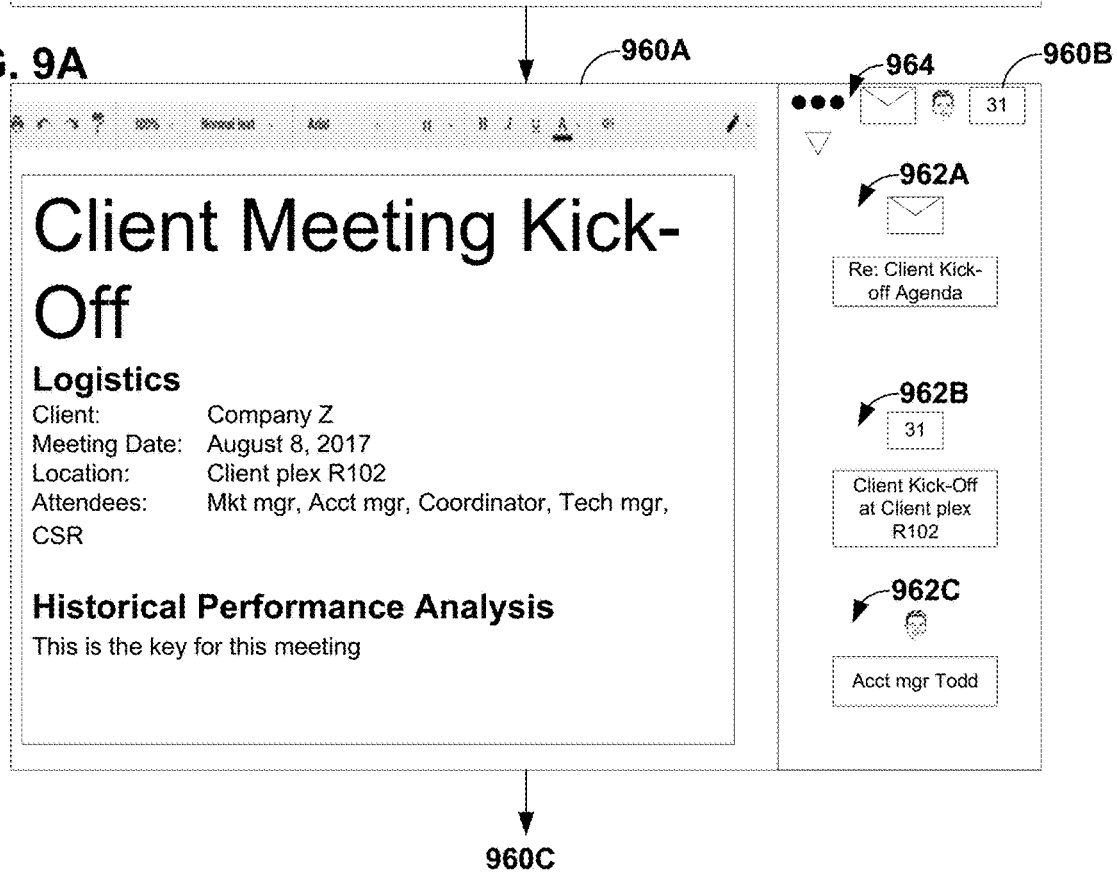
Figure 9C:
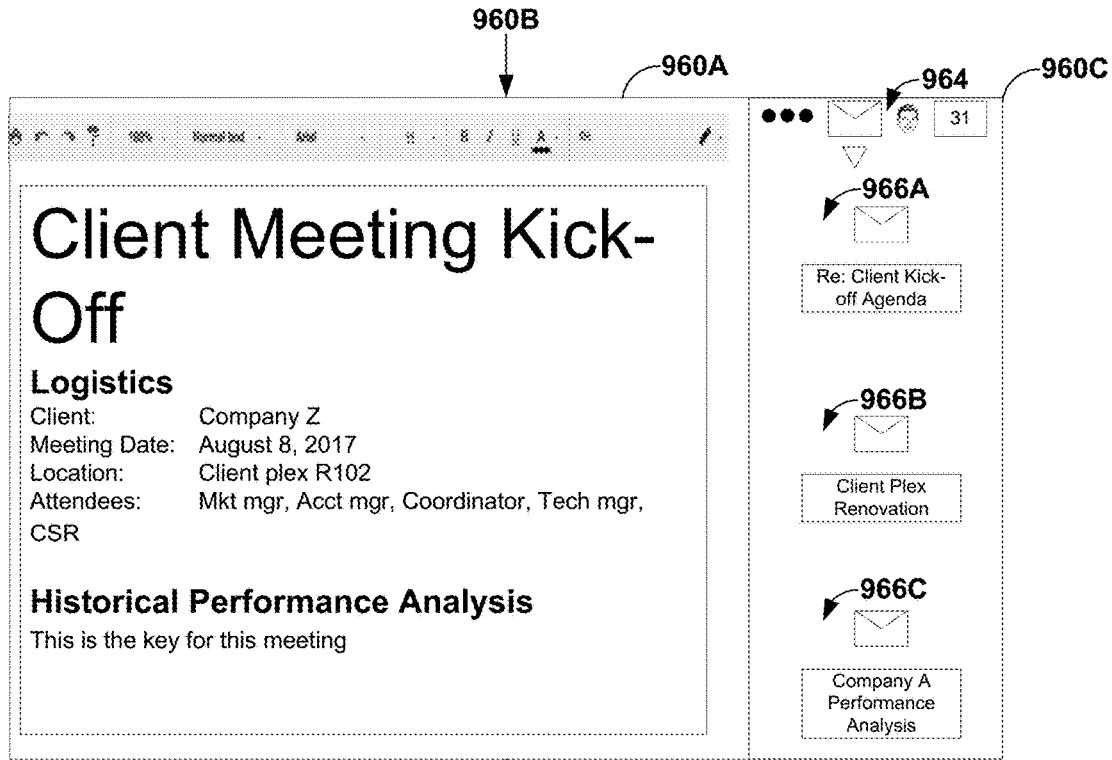
Figure 9D:
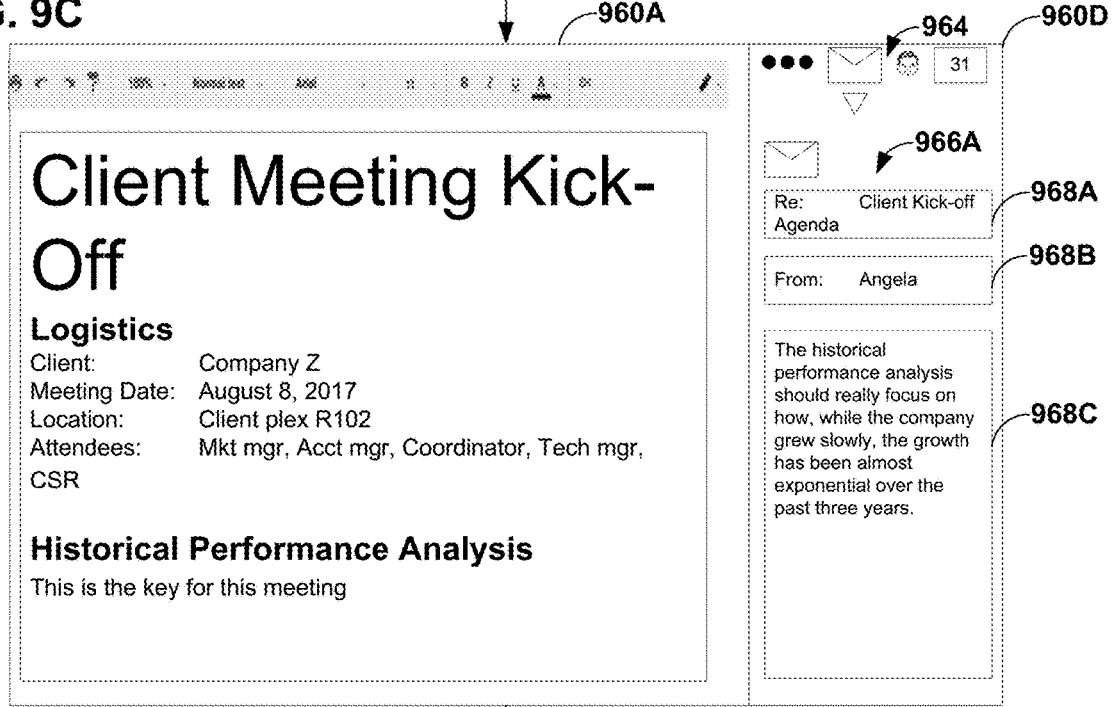
Figure 9E:
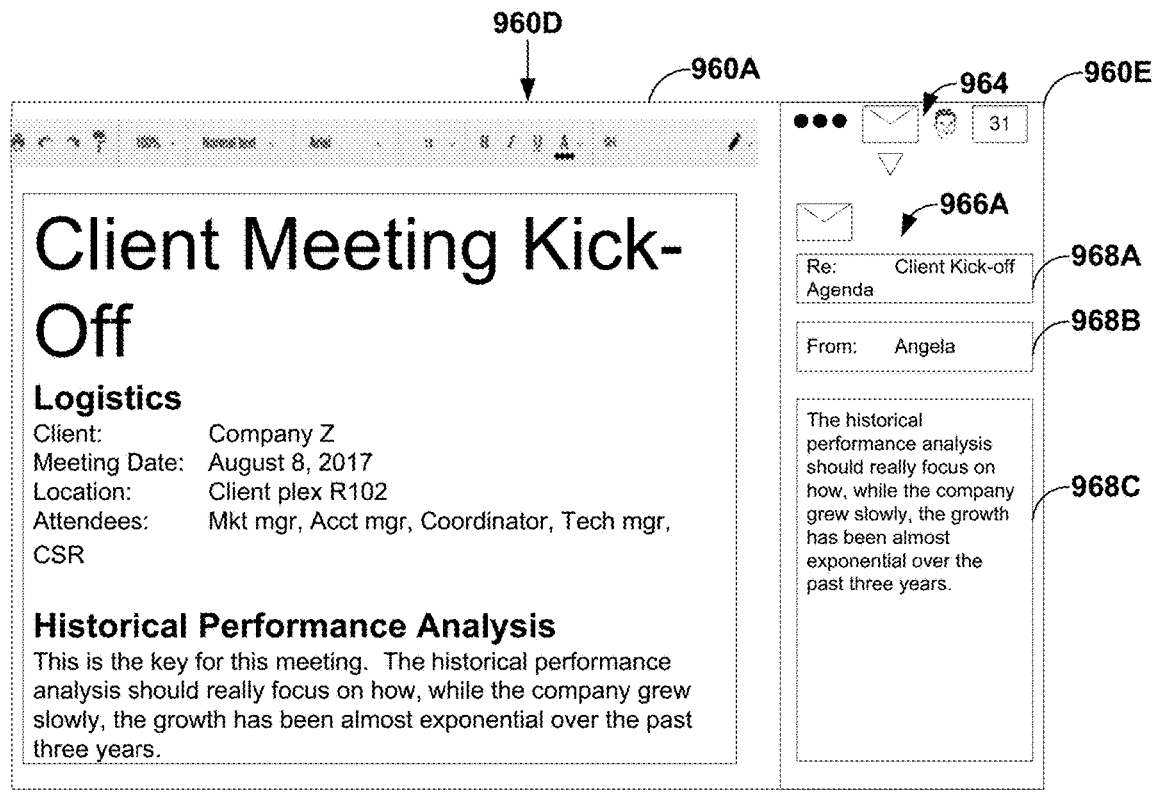

FIGS. 9A-9C are conceptual diagrams illustrating a sequence of operations for an example computing device configured to execute a companion application to identify and display information from various applications that may be relevant to a task being performed using a currently executing application, in accordance with one or more aspects of the present disclosure. FIG. 9 is described below in the context of computing device 210 of FIG. 2. For example, context module 222, while executing at one or more processors of computing device 210, may execute application 218B to produce graphical user interfaces 960A-960E, in accordance with one or more aspects of the present disclosure. For purposes of illustration only, FIG. 9 is described below within the context of computing device 210 of FIG. 1.

In FIG. 9A, computing device 210 may execute application 218A to produce graphical user interface 960A. In the example of FIGS. 9A-9C, application 218A may be a word processing application. Graphical user interface 960A shows that the user may be editing text document about a client meeting for Company Z on Aug. 8, 2017. Further details of the meeting, including an agenda, are included in graphical user interface 960A. A content page for application 218A may be the entire text document, even though graphical user interface 960A may only include a portion of the text document.

At some point, computing device 210 may begin executing application 218B. Application 218B may determine a context of application 218A based on the content page (i.e., the entirety of the text document). Application 218B may extract information about the text document, including any additional authors of the text document and the content of the text document. Based on this context, application 218B may retrieve respective sets of data objects from applications related to application 218A. In the example of FIG. 9A, application 218B may retrieve data objects from an email application, a calendar application, and a contact book application, each of which is related to application 218A. A list of these applications, including a combined page that includes data objects related to all of the applications, may be depicted by graphical element 964.

In the example of FIG. 9A, application 218B may determine that the title of the text document is "Client Meeting Kick-Off." Application 218B may also determine that the related email application includes an email from a co-author of the text document with the subject line "Re: Client Kick-off Agenda." Application 218B may determine that this email may include information that is useful to the user given the current context and output graphical indication 962A of the email message.

Application 218B may also find a calendar event for the meeting discussed in the word document in the calendar application, as well as contact information for one of the attendees of the meeting. As such, application 218B may also output graphical indications 962B and 962C, respectively, of these objects in graphical user interface 960B.

In FIG. 9B and graphical user interface 960C, the user may select the email application from the list of graphical indications 964, as the user may be looking for a particular email discussing the text document. As such, application 218B may generate an updated content page that only includes emails retrieved from a data store for the email application. Graphical indication 966A may be the same email message as originally shown in graphical user interface 960B. However, graphical user interface 960C may also include two additional graphical indications 966B and 966C associated with additional emails not initially displayed in graphical user interface 960B.

Application 218B may then receive an indication of user input selecting graphical indication 966A and the associated email. As such, application 218B may access the related email application to update the graphical user interface to show additional information regarding the selected email message. For instance, application 218B may output, for display in graphical user interface 960D, subject line 968A, contact line 968B, and email body 968C.

In FIG. 9C, application 218B may receive an indication of further user input selecting email body 968C. As such, in graphical user interface 960E, application 218B may perform a function in application 218A using the selected email body 968C. In the example of FIG. 9C, the function correlates to a "copy and paste" function, pasting the body of the email into the text document. In this way, the user is able to quickly navigate between multiple applications that may communicate with one another and transfer relevant information between said applications without ever fully navigating away from the initial application.

FIG. 10 is a flowchart illustrating further example operations of an example computing device configured to execute a companion application to identify and display information from various applications that may be relevant to a task being performed using a currently executing application, in accordance with one or more aspects of the present disclosure. FIG. 10 is described below in the context of computing device 810 of FIG. 8. For example, context module 822, while executing at one or more processors of computing device 810, may execute application 818B to perform operations 1000-1040, in accordance with one or more aspects of the present disclosure. For purposes of illustration only, FIG. 10 is described below within the context of computing device 810 of FIG. 8.

In accordance with the techniques of this disclosure, context module 822 may execute application 818B to receive information associated with a content page for application 818A executing at computing device 810 (1000). Context module 822 may then execute application 818B to determine, based on the content page for application 818A, a context of application 818A for application 818B (1010). The context may include any information regarding a current state of application 818A that may provide an indication of a current task being performed within application 818A, a future task to be performed within application 818A, or any other information relevant to application 818A.

While the example of FIG. 8 describes context module 822 using content objects that UI module 820 is currently outputting for display via UID 812, context module 822 may analyze any content objects within the content page in the context determination process, including content objects that UI module 820 is not currently outputting for display but are on the same content page. For instance, content object 804C may be a reply to a previous email chain, which is included on the content page but off-screen. Context module 822 may use the previous email chain as additional data when determining the context of application 818A.

Based at least in part on the context of application 818A, context module 822 may execute application 818B to determine a respective set of data objects for each application from one or more applications related to application 818A (1020). For instance, application 818A, the email application, may be a part of a web suite of applications. Application 818B may be configured to access data from other applications within the same web suite, which would be related to application 818A. In some instances, any application that may exchange data with application 818A may be considered a related application. Further, any application developed by a same company as application 818A may be considered a related application. In some instances, any application that may interact with same contents of a data storage device as application 818A may be considered a related application.

Application 818B may forward the list of retrieved data objects to UI module 820, which may generate a content page for application 818B that includes one or more graphical indications of at least one data object from at least one of the respective sets of data objects (1030). The content page may include a portion of or the entirety of the set of data objects retrieved by application 818B. UI module 820 may then output, for display at UID 812, graphical user interface 802B that includes at least a portion of the content page for application 818B while at least a portion of graphical user interface 802A is displayed (1040).

By utilizing application 818B to determine contextual information of application 818A executing on computing device 810, computing device 810 may provide a way for a user to quickly obtain documents, files, or any other stored data object determined to be relevant to the task being performed by application 818A on computing device 810 without requiring the user to switch between several different applications, manually navigate to relevant content pages within the respective applications, or discern what input is necessary to move the data objects between the two different applications. For instance, in the example of FIG. 8, the user may drag document 806A, the likely document requested by the user's boss, into the reply field of application 818A's graphical user interface to attach the requested document to a reply email. In this way, techniques of this disclosure may reduce the amount of time and the number of user inputs required to retrieve relevant data objects in other applications, which may simplify the user experience and may reduce power consumption of computing device 810.

In general, the above techniques describe passing information between two applications that are both executing on the computing device such that one application may utilize the information typically only available in the other application. However, different applications typically have different data objects with different formats, meaning that the passing of such data objects is not always possible, additional edits must be made to the passed content, or additional manual inputs are required to update the format of the copied data objects.

As further shown in FIG. 10, application 818A of computing device 810 may receive a data object from application 818B (1050). A format of the first data object may be specific to the second application, and the first data object may include a first set of one or more data structures. In some instances, the one or more values of at least one data structure of the first data object may include at least one of a titular sequence of text, a main sequence of text, one or more images, one or more videos, a mathematical equation, and a formatted list. Application 818A may classify the content as one of these types of content based on metadata associated with the at least one data structure of the first object, the metadata including hard-coded tags (e.g., XML tags) or inferential data corresponding to the structure, layout, or visual characteristics of the content.

Application 818A creates a second data object (1060). The second data object may be formatted specifically for the first application and differently than the first data object. The second data object may include a second set of one or more data structures.

For at least one data structure of the first set of one or more data structures, application 818A may extract one or more values from the respective data structure of the first data object (1070). Based on metadata associated with the respective data structure of the first data object, application 818A may select a particular data structure of the second set of one or more data structures for the second data object (1080). Application 818A may then insert the one or more values from the respective data structure of the first data object into the particular data structure of the second data object (1090).

Application 818A may determine whether another data structure of the first data object is to be included in the second data object (1100). If application 818A determines that there is another data structure of the first data object to be included in the second data object (YES branch of 1100), application 818A may repeat the process (steps 1070-1090) for extracting content from the data structure and inserting the content into a data structure in the second data object. If application 818A determines that there is not another data structure of the first data object to be included in the second data object (NO branch of 1100), application 818A may terminate the process.

As appreciated by the techniques described herein, different applications typically have different file formats, data formats, and ways to create data objects that have unique structures and layouts. Typically, in simple file conversions (such as from an editable document to a printed document format file), images of the editable file are taken without the consideration of particular data structures within either file. In copy and paste operations, the user must explicitly select particular content that is to be transferred, manually navigate to a specific portion of the target destination document where the content is to be placed, and manually reformat the transferred content such that it fits within new application. Some other applications enable the user to embed objects unique to one application within that application's files, but they require accessing the outside application. While many applications attempt to provide a universal experience, more specialized applications generally provide the user with greater control over the content and more features to apply to the content. However, a problem inherent to computing is that recreating content in different specialized applications is a tedious, inexact process that requires many manual inputs from the user.

By passing data objects between applications, techniques of this disclosure may provide a way for a user to quickly transfer documents, files, or any other data stored in a data object within a file for a second application to a data object within a file for a first application without requiring the user to manually navigate to relevant content pages within the respective applications, recreate the data in the first application, or reformat data that is transferred using generic copy-and-paste techniques that stores content to the memory the of computing device. Different applications may serve different functions, but a single user may wish to use the functionality of multiple applications in order to accomplish a task. By reducing the digital and user efforts required to pass information between applications, the computing device may perform the task with greater efficiency, with a simplified user experience, and with less power consumption. In this way, techniques of this disclosure may reduce the amount of time and the number of user inputs required to transfer data objects between applications, which may simplify the user experience and may reduce power consumption of the computing device.

Clause 1. A method comprising: receiving, by a first application executing at a computing device and from a second application executing at the computing device, a first data object, wherein a format of the first data object is specific to the second application, and wherein the first data object comprises a first set of one or more data structures; creating, by the first application, a second data object, wherein a format of the second data object is specific to the first application and different than the format of the first data object, wherein the second data object comprises a second set of one or more data structures; and for at least one data structure of the first set of one or more data structures: extracting, by the first application, one or more values from the respective data structure of the first data object; selecting, by the first application, based on metadata associated with the respective data structure of the first data object, a particular data structure of the second set of one or more data structures for the second data object; and inserting, by the first application, the one or more values from the respective data structure of the first data object into the particular data structure of the second data object.

Clause 2. The method of clause 1, further comprising: outputting, by the first application, for display, a graphical user interface that includes at least a portion of the particular data structure of the second data object.

Clause 3. The method of any one of clauses 1-2, wherein creating the second data object comprises: creating, by the first application, a plurality of data objects that each include at least a portion of a respective data structure of the first data object, wherein the plurality of data objects includes the second data object, and wherein a respective format for each data object in the plurality of data objects is specific to the first application and different than the format of the first data object.

Clause 4. The method of any one of clauses 1-3, wherein the first application comprises a slide presentation application, wherein the second data object comprises one or more graphical slides for the slide presentation application, wherein the second application comprises a note keeping application, and wherein the first data object comprises one or more note documents for the note keeping application.

Clause 5. The method of any one of clauses 1-4, wherein extracting the content the respective data structure of the first data object comprises retrieving, by the first application using extensible markup language (XML), the values of an XML tag for the first data object, and wherein inserting the one or more values from the respective data structure of the first data object into the particular data structure of the second data object comprises setting, by the first application, an XML tag for the second data object to equal the values of the XML tag for the first data object.

Clause 6. The method of clause 5, wherein the one or more data structures of the first data object include a titular data structure and a body data structure, wherein creating the second data object comprises: for the titular data structure of the first data object: selecting, by the first application, a titular data structure of the second data object; and inserting, by the first application, one or more values from the titular data structure of the first data object into the titular data structure of the second data object; and for the body data structure of the first data object: selecting, by the first application, a body data structure of the second data object; and inserting, by the first application, one or more values from the body data structure of the first data object into the body data structure of the second data object.

Clause 7. The method of any one of clauses 1-6, wherein the first application comprises a note keeping application, wherein the second data object comprises one or more note documents for the note keeping application, wherein the second application comprises a slide presentation application, and wherein the first data object comprises one or more note graphical slides for the slide presentation application.

Clause 8. The method of any one of clauses 1-7, wherein the first application comprises a spreadsheet application, and wherein the second data object comprises one or more cells for the spreadsheet application.

Clause 9. The method of any one of clauses 1-8, wherein the first data object is included in a plurality of data object, wherein each data object in the plurality of data objects comprises respective content and respective metadata, and wherein the method further comprises: receiving, by the first application, the first data object of the plurality of data objects; retrieving, by the first application, each data object of the plurality of data objects with the same respective metadata as the first data object; and inserting, by the first application, into the second data object, the one or more values of the at least one data structure of the first data object and respective one or more values of respective one or more data structures of each data object of the plurality of data objects with the same respective metadata as the first data object.

Clause 10. The method of any one of clauses 1-9, wherein the one or more values of the at least one data structure of the first data object comprises at least one of: a titular sequence of text, a main sequence of text, one or more images, one or more videos, a mathematical equation, and a formatted list.

Clause 11. The method of any one of clauses 1-10, further comprising: prior to receiving the first data object: receiving, by the second application, information associated with a content page for the first application executing at the computing device, wherein at least a first portion of the content page for the first application is included in a graphical user interface of the computing device; determining, by the second application and based on the information associated with the content page for the second application, a context of the first application; determining, by the second application and based at least in part on the context of the first application, a respective set of data objects for each application from one or more applications related to the first application, wherein the respective set of data objects includes the first data object; generating, by the second application and based at least in part on the respective sets of data objects, a content page for the second application including one or more graphical indications of at least one data object from at least one of the respective sets of data objects, wherein the at least one data object includes the first data object; and while at least a second portion of the content page for the first application is included in the graphical user interface, outputting, by the second application, for display, at least a portion of the content page for the second application within the graphical user interface of the computing device.

Clause 12. The method of clause 11, wherein determining the context of the second application comprises: identifying, by the second application, one or more content objects in the content page for the first application; extracting, by the second application, at least one respective property of each of the one or more content objects; and determining, by the second application and based at least in part on one or more properties of the at least one respective property of each of the one or more content objects, the context of the first application.

Clause 13. The method of clause 12, wherein the one or more content objects include one or more of text, images, metadata, an application state, application code, field identifiers, file names, or file types.

Clause 14. The method of any one of clauses 11-13, wherein determining the respective set of data objects for each application from the one or more applications related to the first application comprises: constructing, by the second application and based on the context, a respective search query for each of the one or more applications related to the first application; and executing, by the second application, each respective search query from the respective search queries to retrieve the respective set of data objects from data of a corresponding application from the one or more applications related to the first application.

Clause 15. The method of any one of clauses 11-14, wherein the one or more applications related to the first application comprises at least two applications related to the first application, and wherein generating the content page for the first application comprises generating, by the second application and based at least in part on the respective sets of data objects for the at least two applications related to the first application, the content page for the second application including at least one graphical indication of at least one data object from the respective sets of data objects for each application from the at least two applications related to the first application.

Clause 16. The method of any one of clauses 11-15, further comprising: receiving, by the second application, an indication of user input selecting a first graphical indication of the first data object from the one or more graphical indications of the at least one data object included in the content page for the second application; and sending, by the second application, the first data object to the first application.

Clause 17. The method of any one of clauses 11-16, further comprising: receiving, by the second application, an indication of a selection of one or more graphical indications representing one or more content objects included in the content page of the first application; determining, by the second application and based on the one or more content objects, an updated context of the first application; determining, by the second application and based at least in part on the updated context of the first application, a respective updated set of data objects for each application from the one or more applications related to the first application; generating, by the second application and based at least in part on the respective updated sets of data objects, an updated content page for the first application including one or more graphical indications of at least one data object from at least one of the respective updated sets of data objects; and while at least a third portion of the content page for the first application is included in the graphical user interface, outputting, by the second application, for display, a portion of the updated content page for the second application within the graphical user interface of the computing device.

Clause 18. The method of any one of clauses 11-17, wherein outputting the portion of the content page for the second application comprises: while at least the second portion of the content page for the first application is included in the graphical user interface, replacing, by the second application, a portion of the graphical user interface with the portion of the content page for the first application.

Clause 19. The method of any one of clauses 11-18, wherein the portion of the content page for the second application that is output for display includes one or more graphical indications of at least one data object from a first set of data objects for an application from the one or more applications related to the first application, the method further comprising: receiving, by the second application, an indication of user input selecting a different application from the one or more applications related to the first application; generating, by the second application, based at least in part on the respective sets of data objects, an updated content page for the first application including one or more graphical indications of at least one data object from a second set of data objects for the different application from the one or more applications related to the first application; and while at least the second portion of the content page for the first application is included in the graphical user interface, outputting, by the second application, for display, a portion of the updated content page for the second application within the graphical user interface of the computing device.

Clause 20. The method of any one of clauses 11-19, further comprising: prior to determining the context, receiving, by the computing device, an indication of user input to begin executing the second application; and responsive to receiving the indication of user input, determining, by the second application, the context.

Clause 21. The method of any one of clauses 11-20, wherein the second application comprises a companion application.

Clause 22. The method of any one of clauses 1-21, wherein the first data object comprises a list of values, and wherein the second data object comprises one of an image of the list of values a graphical chart that portrays the list of values.

Clause 23. The method of any one of clauses 1-22, wherein the first data object comprises an image, and wherein the method further comprises: conditionally formatting, by the first application, the image of the first data object based on one or more requirements for images in the first application; and inserting, by the first application, the conditionally formatted image into the second data object.

Clause 24. A computing device comprising: at least one processor; and a memory that stores instructions associated with a first application that, when executed, cause the at least one processor to: receive, from a second application executing at the computing device, a first data object, wherein a format of the first data object is specific to the second application, and wherein the first data object comprises a first set of one or more data structures; create a second data object, wherein a format of the second data object is specific to the first application and different than the format of the first data object, wherein the second data object comprises a second set of one or more data structures; and for at least one data structure of the first set of one or more data structures: extract one or more values from the respective data structure of the first data object; select, based on metadata associated with the respective data structure of the first data object, a particular data structure of the second set of one or more data structures for the second object; and insert the one or more values from the respective data structure of the first data object into the particular data structure of the second data object.

Clause 25. The computing device of clause 24, wherein the memory further stores instructions associated with the first application that, when executed, cause the at least one processor to: output, for display, a graphical user interface that includes at least a portion of the particular data structure of the second data object.

Clause 26. The computing device of any one of clauses 24-25, wherein the instructions that cause the at least one processor to create the second data object comprise instructions that, when executed, cause the at least one processor to: create a plurality of data objects that each include at least a portion of a respective data structure of the first data object, wherein the plurality of data objects includes the second data object, and wherein a respective format for each data object in the plurality of data objects is specific to the first application and different than the format of the first data object.

Clause 27. The computing device of any one of clauses 24-26, wherein the instructions that cause the at least one processor to the content the respective data structure of the first data object comprise instructions that, when executed, cause the at least one processor to retrieve, using extensible markup language (XML), the values of an XML tag for the first data object, and wherein the instructions that cause the at least one processor to insert the one or more values from the respective data structure of the first data object into the particular data structure of the second data object comprise instructions that, when executed, cause the at least one processor to set an XML tag for the second data object to equal the values of the XML tag for the first data object.

Clause 28. A non-transitory computer-readable storage medium storing instructions associated with a first application that, when executed, cause at least one processor of a computing device to: receive, from a second application executing at the computing device, a first data object, wherein a format of the first data object is specific to the second application, and wherein the first data object comprises a first set of one or more data structures; create a second data object, wherein a format of the second data object is specific to the first application and different than the format of the first data object, wherein the second data object comprises a second set of one or more data structures; and for at least one data structure of the first set of one or more data structures: extract one or more values from the respective data structure of the first data object; select, based on metadata associated with the respective data structure of the first data object, a particular data structure of the second set of one or more data structures for the second object; and insert the one or more values from the respective data structure of the first data object into the particular data structure of the second data object.

Clause 29. The non-transitory computer-readable storage medium of clause 28, wherein the instructions that cause the at least one processor to create the second data object comprise instructions that, when executed, cause the at least one processor to: create a plurality of data objects that each include at least a portion of a respective data structure of the first data object, wherein the plurality of data objects includes the second data object, and wherein a respective format for each data object in the plurality of data objects is specific to the first application and different than the format of the first data object.

Clause 30. The non-transitory computer-readable storage medium of any one of clauses 28-29, wherein the instructions that cause the at least one processor to the content the respective data structure of the first data object comprise instructions that, when executed, cause the at least one processor to retrieve, using extensible markup language (XML), the values of an XML tag for the first data object, and wherein the instructions that cause the at least one processor to insert the one or more values from the respective data structure of the first data object into the particular data structure of the second data object comprise instructions that, when executed, cause the at least one processor to set an XML tag for the second data object to equal the values of the XML tag for the first data object.

Clause 31. A computing device configured to perform any of the methods of clauses 1-23.

Clause 32. A computing device comprising means for performing any of the methods of clauses 1-23.

Clause 33. A computer-readable storage medium encoded with instructions for causing one or more programmable processors to perform any of the methods or clauses 1-23.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
receiving, by a first application executing at a computing device and configured to present calendar entries and from a second application executing at the computing device and configured to present messages, a message data object, wherein a format of the message data object is specific to the second application, and wherein the message data object comprises a first set of one or more data structures;
automatically creating, by the first application, without receiving a user input indicating a modification to the format of the message data object, a calendar data object, wherein a format of the calendar data object is specific to the first application and different than the format of the message data object, wherein the calendar data object comprises a second set of one or more data structures; and
for at least one data structure of the first set of one or more data structures:
extracting, by the first application, one or more values from a respective data structure of the first set of one or more data structures for the message data object;
selecting, by the first application, based on metadata labelling the respective data structure of the first set of one or more data structures for the message data object, a particular data structure of the second set of one or more data structures for the calendar data object; and
inserting, by the first application, the one or more values from the respective data structure of the first set of one or more data structures for the message data object into the particular data structure of the second set of one or more data structures for the calendar data object such that text identified by the message data object is inserted as a different one or more data structures of the second set of one or more data structures for the calendar data object.

2. The method of claim 1, further comprising:
prior to receiving the message data object:
receiving, by the second application, information associated with a content page for the first application executing at the computing device, wherein at least a first portion of the content page for the first application is included in a graphical user interface of the computing device;

determining, by the second application and based on the information associated with the content page for the first application, a context of the first application;

determining, by the second application and based at least in part on the context of the first application, a respective set of data objects for each application from one or more applications related to the first application, wherein the respective set of data objects includes the message data object;

generating, by the second application and based at least in part on the respective sets of data objects, a content page for the second application including one or more graphical indications of at least one data object from at least one of the respective sets of data objects, wherein the at least one data object includes the message data object; and while at least a second portion of the content page for the first application is included in the graphical user interface, outputting, by the second application, for display, at least a portion of the content page for the second application within the graphical user interface of the computing device.

3. The method of claim 2,
wherein the metadata labelling the respective data structure of the message data object comprises one or more of an Extensible Markup Language (XML) tag or inferential data regarding a structure, a location, or a characteristic of the respective data structure, and wherein the context of the first application comprises one or more of a current state of the first application, a current task being performed within the first application, or a future task to be performed within the first application.

4. The method of claim 1, wherein creating the second data object comprises:
creating, by the first application, a plurality of data objects that each include at least a portion of a respective data structure of the message data object, wherein the plurality of data objects includes the calendar data object, and wherein a respective format for each data object in the plurality of data objects is specific to the first application and different than the format of the message data object.

5. The method of claim 1,
wherein extracting the one or more values from the respective data structure of the message data object comprises retrieving, by the first application using extensible markup language (XML), the values of an XML tag for the message data object, and wherein inserting the one or more values from the respective data structure of the message data object into the particular data structure of the calendar data object comprises setting, by the first application, an XML tag for the calendar data object to equal the values of the XML tag for the message data object.

6. The method of claim 1, wherein the one or more data structures of the message data object include a titular data structure and a body data structure, wherein creating the calendar data object comprises:
for the titular data structure of the message data object:
selecting, by the first application, the titular data structure of the calendar data object; and
inserting, by the first application, one or more values from the titular data structure of the message data object into the titular data structure of the calendar data object; and
for the body data structure of the message data object:

selecting, by the first application, the one or more body data structures of the calendar data object; and
inserting, by the first application, one or more values from the body data structure of the message data object into the body data structure of the calendar data object.

7. The method of claim 1,
wherein the first application comprises a message application,
wherein the calendar data object comprises one or more messages for the message application,
wherein the second application comprises a calendar application, and
wherein the message data object comprises one or more calendar entries for the calendar application.

8. The method of claim 1, wherein the message data object is included in a plurality of message data objects, wherein each of the message data objects in the plurality of message data objects comprises respective content and respective metadata, and wherein the method further comprises:
receiving, by the first application, the message data object of the plurality of message data objects;
retrieving, by the first application, each of the message data objects of the plurality of message data objects with the same respective metadata as the message data object; and
inserting, by the first application, into the calendar data object, the one or more values of the one or more data structures of the message data object and respective one or more values of respective one or more data structures of each data object of the plurality of data objects with the same respective metadata as the message data object.

9. The method of claim 1, wherein the one or more values of the at least one data structure of the message data object comprises at least one of:
a titular sequence of text,
a main sequence of text,
one or more images,
one or more videos,
a mathematical equation, and
a formatted list.

10. The method of claim 1, wherein the message data object comprises a list of values, and wherein the calendar data object comprises one of an image of the list of values or a graphical chart that portrays the list of values.

11. The method of claim 1, wherein the message data object comprises an image, and wherein the method further comprises:
conditionally formatting, by the first application, the image of the message data object based on one or more requirements for images in the first application; and
inserting, by the first application, the conditionally formatted image into the calendar data object.

12. A computing device comprising:
at least one processor; and
a memory that stores instructions associated with a first application and configured to present calendar entries that, when executed, cause the at least one processor to:
receive, from a second application executing at the computing device and configured to present messages, a message data object, wherein a format of the message data object is specific to the second application, and wherein the message data object comprises a first set of one or more data structures;

automatically create, without receiving a user input indicating a modification to the format of the message data object, a calendar data object, wherein a format of the calendar data object is specific to the first application and different than the format of the calendar data object, wherein the calendar data object comprises a second set of one or more data structures; and for at least one data structure of the first set of one or more data structures:
extract one or more values from a respective data structure of the first set of one or more data structures for the message data object;
select, based on metadata labelling the respective data structure of the first set of one or more data structures for the message data object, a particular data structure of the second set of one or more data structures for the calendar data object; and
insert the one or more values from the respective data structure of the first set of one or more data structures for the message data object into the particular data structure of the second set of one or more data structures for the calendar data object such that a title of the message data object identified by the metadata is inserted as a titular data structure of the second set of one or more data structures for the calendar data object, and body text identified by the metadata and associated with the title of the message data object is inserted as a different one or more body data structures of the second set of one or more data structures for the calendar data object.

13. The computing device of claim 12, wherein the memory further stores instructions associated with the second application that, when executed, cause the at least one processor to:
prior to receiving the message data object:
receive information associated with a content page for the first application executing at the computing device, wherein at least a first portion of the content page for the first application is included in a graphical user interface of the computing device;
determine, based on the information associated with the content page for the first application, a context of the first application;
determine, based at least in part on the context of the first application, a respective set of data objects for each application from one or more applications related to the first application, wherein the respective set of data objects includes the message data object;
generate, based at least in part on the respective sets of data objects, a content page for the second application including one or more graphical indications of at least one data object from at least one of the respective sets of data objects, wherein the at least one data object includes the message data object; and
while at least a second portion of the content page for the first application is included in the graphical user interface, output, for display, at least a portion of the content page for the second application within the graphical user interface of the computing device.

14. The computing device of claim 12, wherein the instructions that cause the at least one processor to create the calendar data object comprise instructions that, when executed, cause the at least one processor to:
create a plurality of data objects that each include at least a portion of a respective data structure of the message data object, wherein the created plurality of data objects includes the calendar data object, and wherein a respective format for each data object in the plurality of data objects is specific to the first application and different than the format of the message data object.

15. The computing device of claim 12, wherein the instructions that cause the at least one processor to extract the one or more values from the respective data structure of the message data object comprise instructions that, when executed, cause the at least one processor to retrieve, using extensible markup language (XML), the values of an XML tag for the message data object, and
wherein the instructions that cause the at least one processor to insert the one or more values from the respective data structure of the message data object into the particular data structure of the calendar data object comprise instructions that, when executed, cause the at least one processor to set an XML tag for the calendar data object to equal the values of the XML tag for the message data object.

16. A non-transitory computer-readable storage medium storing instructions associated with a first application configured to present calendar entries that, when executed, cause at least one processor of a computing device to:
receive, from a second application executing at the computing device and configured to present messages, a message data object, wherein a format of the message data object is specific to the second application, and wherein the message data object comprises a first set of one or more data structures;
automatically create, without receiving a user input indicating a modification to the format of the message data object, a calendar data object, wherein a format of the calendar data object is specific to the first application and different than the format of the message data object, wherein the calendar data object comprises a second set of one or more data structures; and
for at least one data structure of the first set of one or more data structures:
extract one or more values from the respective data structure of the message data object;
select, based on metadata labelling a respective data structure of the first set of one or more data structures for the calendar data object, a particular data structure of the second set of one or more data structures for the calendar data object; and
insert the one or more values from the respective data structure of the first set of one or more data structures for the message data object into the particular data structure of the calendar data object such that a title of the message data object identified by the metadata is inserted as a titular data structure of the second set of one or more data structures of the calendar data object, and body text identified by the metadata and associated with the title of the message data object is inserted as a different one or more body data structures of the second set of one or more data structures of the calendar data object.

17. The non-transitory computer-readable storage medium of claim 16, wherein the non-transitory computer-readable storage medium further stores instructions associated with the second application that, when executed, cause the at least one processor to:
prior to receiving the message data object:
receive information associated with a content page for the first application executing at the computing device, wherein at least a first portion of the content page for the first application is included in a graphical user interface of the computing device;

determine, based on the information associated with the content page for the first application, a context of the first application;

determine, based at least in part on the context of the first application, a respective set of data objects for each application from one or more applications related to the first application, wherein the respective set of data objects includes the message data object;

generate, based at least in part on the respective sets of data objects, a content page for the second application including one or more graphical indications of at least one data object from at least one of the respective sets of data objects, wherein the at least one data object includes the message data object; and while at least a second portion of the content page for the first application is included in the graphical user interface, output, for display, at least a portion of the content page for the second application within the graphical user interface of the computing device.

18. The non-transitory computer-readable storage medium of claim 16, wherein the instructions that cause the at least one processor to extract the one or more values from the respective data structure of the first set of one or more data structures for the message data object comprise instructions that, when executed, cause the at least one processor to retrieve, using extensible markup language (XML), the values of an XML tag for the message data object, and wherein the instructions that cause the at least one processor to insert the one or more values from the respective data structure of the first set of one or more data structures for the message data object into the particular data structure of the calendar data object comprise instructions that, when executed, cause the at least one processor to set an XML tag for the calendar data object to equal the values of the XML tag for the message data object.

* * * * *